US008410183B2

(12) United States Patent
Cortright et al.

(10) Patent No.: US 8,410,183 B2
(45) Date of Patent: Apr. 2, 2013

(54) METHOD FOR PRODUCING BIO-FUEL THAT INTEGRATES HEAT FROM CARBON-CARBON BOND-FORMING REACTIONS TO DRIVE BIOMASS GASIFICATION REACTIONS

(75) Inventors: Randy D. Cortright, Madison, WI (US); James A. Dumesic, Verona, WI (US)

(73) Assignees: Wisconsin Alumni Research Foundation, Madison, WI (US); Virent, Inc., Madison, WI (US)

(*) Notice: Subject to any disclaimer, the term of this patent is extended or adjusted under 35 U.S.C. 154(b) by 0 days.

(21) Appl. No.: 13/410,330

(22) Filed: Mar. 2, 2012

(65) Prior Publication Data

US 2012/0165416 A1 Jun. 28, 2012

Related U.S. Application Data

(60) Division of application No. 12/962,747, filed on Dec. 8, 2010, now Pat. No. 8,153,698, which is a continuation of application No. 11/690,533, filed on Mar. 23, 2007, now Pat. No. 7,872, 054.

(60) Provisional application No. 60/785,471, filed on Mar. 24, 2006.

(51) Int. Cl.
*C07C 27/00* (2006.01)

(52) U.S. Cl. .......................................... 518/700; 518/702

(58) Field of Classification Search .................. 518/700, 518/702

See application file for complete search history.

(56) References Cited

U.S. PATENT DOCUMENTS

| 4,567,205 | A | 1/1986 | Arcuri et al. |
| 6,824,682 | B2 | 11/2004 | Branson |
| 6,953,873 | B2 | 10/2005 | Cortright |
| 6,964,757 | B2 | 11/2005 | Cortright et al. |
| 2003/0099593 | A1 | 5/2003 | Cortright et al. |
| 2003/0111410 | A1 | 6/2003 | Branson |
| 2003/0220531 | A1 | 11/2003 | Cortright |

FOREIGN PATENT DOCUMENTS

| EP | 0 553 815 A1 | 8/1993 |
| WO | 00/03126 A1 | 1/2000 |
| WO | 01/66499 A1 | 9/2001 |
| WO | 03/035582 A1 | 5/2003 |
| WO | 2004/083114 A3 | 9/2004 |
| WO | WO 2007/027669 | * 3/2007 |

OTHER PUBLICATIONS

Aramendia et al., (2004) *Colloids and Surfaces A: Physicochem. Eng. Aspects 234*: 17, "Synthesis and textural-structural characterization of magnesia, magnesia-titania and magnesia-zirconia catalysts".

Asadullah et al., (2002) *Environ. Sci. Technol*. 36: 4476, "Energy Efficient Production of Hydrogen and Syngas from Biomass: Development of Low-Temperature Catalytic Process for Cellulose Gasification".
Bain et al, (2005) *Ind. Eng. Chem. Res*. 44: 7945, "Evaluation of Catalyst Deactivation during Catalytic Steam Reforming of Biomass-Derived Syngas".
Basinska et al., (1999) *Appl. Catal., A: Gen*. 183: 143, "The effect of support on WGSR activity of ruthenium catalysts".
Benvenuti, et al., (2000) App. Catal. A: Gen 199: 123, "Selective dimerization of propylene to 2,3-dimethylbutenes by homogeneous catalysts prepared from halogen($\beta$-dithioacetylacetonato)nickel(II) complexes containing a highly hindered alkyl phosphine ligand and difference aluminum co-catalysts".
Chornet et al., "Biomass-to-hydrogen via fast pyrolysis and catalytic steam reforming," (Proceedings of the U.S. Dept. of Energy Hydrogen Program Review, 1996).
Christoffersen et al., (2001) Anode Materials for Low-Temperature Fuel Cells: A Density Functional Theory Study, *J. of Catal*. 199:123.
Cortright et al., (2002) *Nature* 418: 964 "Hydrogen from catalytic reforming of biomass-derived hydrocarbons in liquid water".
Czernik et al., (2002) *Ind. Eng. Chem. Res*. 4: 4209, "Hydrogen by Catalytic Steam Reforming of Liquid Byproducts from Biomass Thermoconversion Processes".
Davda et al. (2004) *Chem. Comm*. 1: 36, "Renewable hydrogen by aqueous-phase reforming of glucose".
Encinar et al., (2005) *Ind. Eng. Chem. Res*. 44: 549, "Biodiesel from Used Frying Oil. Variables Affecting the Yields and Characteristics of the Biodiesel".
Esch et al., (2005) *Science* 309:752, "Electron Localization Determines Defect Formation on Ceria Substrates".
Gong et al., (2000) *Appl. Physics* Letters vol. 76, No. 26: 3959, "Nanycrystalline p-type transparent Cu-Al-O semiconductor prepared by chemical-vapor deposition with $Cu(acac)_2$ and $Al(acac)_3$ precursors".
Gorte et al., (2005) *Catal. Today* 104:18, "Studies of the water-gas shift reaction with ceria-supported precious metals".
Greely et al., (2004) *Nature Mater*. 3:810, "Alloy catalysts designed from first principles".
Hamelinck et al., (2004), *Energy*, 29:1743-1771, "Production of FT transportation fuels from biomass; technical options, process analysis and optimisation, and development potential".
Hirai et al., (2005) *Ener. Fuels* 19:1761, "Production of Hydrogen by Steam Reforming of Glycerin on Ruthenium Catalyst".
Hori et al., (1998) *Appl. Catal. B: Environ*. 16:105, "Thermal stability of oxygen storage properties in a mixed $CeO_2$-$ZrO_2$ system".

(Continued)

*Primary Examiner* — Jafar Parsa
(74) *Attorney, Agent, or Firm* — Joseph T. Leone, Esq.; DeWitt Ross & Stevens S.C.

(57) ABSTRACT

A low-temperature catalytic process for converting biomass (preferably glycerol recovered from the fabrication of biodiesel) to synthesis gas (i.e., $H_2$/CO gas mixture) in an endothermic gasification reaction is described. The synthesis gas is used in exothermic carbon-carbon bond-forming reactions, such as Fischer-Tropsch, methanol, or dimethylether syntheses. The heat from the exothermic carbon-carbon bond-forming reaction is integrated with the endothermic gasification reaction, thus providing an energy-efficient route for producing fuels and chemicals from renewable biomass resources.

26 Claims, 8 Drawing Sheets

OTHER PUBLICATIONS

Hornstra et al., (1978) *Journal of Crystal Growth* 44:513, "Determination of the Lattice Constant of Epitaxial Layers of III-V Compounds".

Huber et al., (2003) *Science* 300:2075, "Raney Ni-Sn Catalyst for H[sub2] Production from Biomass-Derived Hydrocarbons".

Iglesia et al., (1991), *J. Catal.*, 129:238-256, "Transport-Enhanced α-Olefin Readsorption Pathways in Ru-Catalyzed Hydrocarbon Synthesis".

Iglesia et al., (1992), Fischer-Tropsch Synthesis opn Cobalt and Ruthenium. Metal Dispersion and Support Effects on Reaction Rate and Selectivity, *J. of Catal.*, 137:212-224.

Iglesia, et al., (1993), Selectivity Control and Catalyst Design in the Fischer-Tropsch Synthesis: Sites, Pellets, and Reactors, *Adv. In Catal.* 39:221.

Iglesia et al., (1997) *Appl. Catal. A Gen.*, 161:59-78, "Design, synthesis, and use of cobalt-based Fischer-Tropsch synthesis catalysts".

Kahraman Bozbas, (2008) *Renew. Sustain. Ener. Rev.*, 12:542, "Biodiesel as an alternative motor fuel: Production and policies in the European Union".

Mass et al., Biomass for Renewable Energy, Fuels and Chemicals (Academic Press, San Diego, 1998).

Linhoff et al., (1984) *Chem. Eng. Progress*, pp. 33-40, "Heat Transfer: Pinch Technology Has Come of Age".

Linhoff, (1993) Pinch Analysis—A State-Of-The-Art Overview, *Chem Eng. Res. & Design* 71(A5), 503-522.

Patzek et al., (2005) *Critical Reviews in Plant Sciences*, 24:327-364, "Thermodynamics of Energy Production from Biomass".

Pimentel et al., (2005) Ethanol Production Using Corn, Switchgrass, and Wood; Biodiesel Production Using Soybean and Sunflower, *Nat. Resources Res.* 14:65.

Pokrovski et al., (2005) *J. Catal.* 235:368, "Effects of Cerium incorporation into zirconia on the activity of $Cu/ZrO_2$ for methanol synthesis via CO hydrogenation".

Shabaker et al., *J. Catal.* (2003) 215:344, "Aqueous-phase reforming of methanol and ethylene glycol over alumina-supported platinum catalysts".

Shapouri et al., The Energy Balance of Corn: An Update (report No. 814, Office of the Chief Economist, U.S. Department of Agriculture, 2002; available at http://www.usda.gov/oce/oepnu/aer-814.pdf).

Soares et al., (2006) *Angew. Chem. Int. Ed*, 45:3982-3985, "Glycerol as a Source for Fuels and Chemicals by Low-Temperature Catalytic Processing".

Spiewak et al., (1995) *J. Phys. Chem.* 99:17640, "Microcalorimetric Studies of CO and $H_2$ Adsorption on Nickel Powders Promoted with Potassium and Cesium".

Steynberg et al., (1999) *Appl. Catal., A:Gen.*, 186:41, "High temperature Fischer-Tropsch synthesis in commercial practice".

Taylor, (1975) Determination of Ruthenium Surface Areas by Hydrogen and Oxygen Chemisorption, *J. Catal.*, 38:299-306.

Van Gerpen, (2005) *Fuel Proc. Technol.* 86:1097, "Biodiesel processing production".

* cited by examiner

METHOD FOR PRODUCING BIO-FUEL THAT INTEGRATES HEAT FROM CARBON-CARBON BOND-FORMING REACTIONS TO DRIVE BIOMASS GASIFICATION REACTIONS

CROSS-REFERENCE TO RELATED APPLICATIONS

This is a divisional of co-pending application Ser. No. 12/962,747, filed Dec. 8, 2010, now U.S. Pat. No. 8,153,698 which is a continuation of co-pending application Ser. No. 11/690,533, filed Mar. 23, 2007, now U.S. Pat. No. 7,872,054, issued Jan. 18, 2011, which claims priority to provisional application Ser. No. 60/785,471, filed Mar. 24, 2006, all of which are incorporated herein by reference.

FEDERAL FUNDING STATEMENT

This invention was made with United States government support awarded by the following agencies: DOE DE-FG02-84ER13183. The United States has certain rights in this invention.

BACKGROUND

In the present era of diminishing petroleum reserves and political instability in petroleum-rich countries, industrial society must develop ways to utilize the world's abundant and renewable biomass resources to provide new sources of energy and chemical intermediates (1). For example, the transportation sector requires fuels that can be efficiently converted to energy and that possess high energy densities. The chemical industry requires functional molecules such as olefins (e.g., ethylene, propylene) and aldehydes (e.g., formaldehyde) that can be used to make polymeric materials. A feature that makes biomass-derived carbohydrates a particularly promising class of compounds to supplement (or in some cases replace) petroleum in the aforementioned areas is that the stoichiometric building block in these compounds has an atomic composition of H:C:O equal to 2:1:1. Thus, carbohydrates are ideal candidates to be converted to $H_2$/CO gas mixtures. These types of gases are commonly called "synthesis gas," or simply "syngas." Synthesis gas can be converted by Fischer-Tropsch synthesis over Fe- and Co-based catalysts (2) to yield long-chain linear alkanes for use as diesel fuel. Synthesis gas can also be converted over Cu-based catalysts (3) to yield methanol for use as a feed to produce olefins, formaldehyde, and gasoline.

While producing synthesis gas from biomass has been recognized for years as a promising platform from which a variety of valuable products can be made, conventional routes to produce synthesis gas from biomass are not terribly efficient because of the high temperatures required. For example, direct catalytic gasification of biomass requires a temperature of 800 K and higher (4). Two-stage gasification of biomass likewise requires high temperatures: a fast pyrolysis of biomass (at about 773 K), followed by a steam reforming of the resulting bio-oil (at about 1000 K) (5, 6). Moreover, gasification of biomass typically leads to a complex set of byproducts, including tar (volatile organics), char (solid carbonaceous materials), and light hydrocarbons, as well as NO and $SO_x$ compounds produced during high temperature combustion processes (1, 4-6).

A relatively recent, and rapidly growing, use of biomass is in the production of bio-diesel fuel via the trans-esterification of vegetable oils and animal fats (1, 7, 8). The trans-esterification reaction yields a low-value waste stream of glycerol that often contains glycerol-in-water concentrations from 50 to 80% (8). The resulting glut has caused the U.S. price of glycerol to tumble from roughly $2,100 per metric ton in 1995, to less than $1,000 per metric ton in 2003 (for USP-grade 97% glycerol, prices supplied by Procter & Gamble). The current (2006) production of bio-diesel in the United States and Europe is $1 \times 10^8$ and $2 \times 10^9$ liters per year, respectively. Due to tax credits and other economic incentives provided by several national governments, these quantities are expected to double in the very near future (8, 9). Regarding bio-diesel fuel tax credits in the United States see IRS Publication No. 378, and sections 6426(c), 6427(e), and 40A of the Internal Revenue Code.

Glycerol can also be produced by fermenting sugars such as glucose (10). Unlike fermenting glucose to yield ethanol, which produces ethanol at concentrations of only about 5 wt % in water, fermenting glucose to yield glycerol can produce glycerol at concentrations near 25 wt % (10). This higher concentration of glycerol compared to ethanol decreases the energy costs required to remove water from the oxygenated hydrocarbon fuel. Indeed, one of the most energy-intensive steps involved in the production of fuel-grade ethanol from glucose is the distillation step (11, 12). Another route for production of glycerol from glucose and other sugars is through hydrogenation of glucose to sorbitol (13, 14), followed by hydrogenolysis of sorbitol to polyols having lower molecular weights (15, 16).

In previous work co-authored by some of the present inventors (17-19), it was shown that solutions of polyols in water (e.g., ethylene glycol, glycerol, sorbitol) could be converted by aqueous-phase reforming to $H_2$/$CO_2$ gas mixtures containing low levels of CO (e.g., 500 ppm) over supported Pt catalysts at temperatures near 500 K. This aqueous-phase reforming process gives rise to low $CO:CO_2$ ratios in the effluent gas to stream because the water-gas shift (WGS) reaction is highly favored at the high partial pressures of water generated under these reaction conditions (e.g., 25 bar). Thus, aqueous-phase reforming reaction conditions are not favorable for producing synthesis gas, where high $CO:CO_2$ ratios are required. Other researchers have studied the vapor-phase reforming of glycerol. Czernik et al. (20) reported high selectivity for producing $H_2$ by steam reforming of glycerol at high temperatures (1023 K) over a commercial Ni-based naphtha reforming catalyst. Suzuki et al. (21) also observed high selectivity for production of $H_2$ by steam reforming of glycerol at high temperatures (873 K) over a 3% Ru/$Y_2O_3$ catalyst, but they employed a high space velocity of sweep gas in the experiments. Therefore, a better catalytic system for vapor phase conversion of glycerol at low temperatures remains to be developed.

The Fischer-Tropsch (F-T) synthesis for producing synthetic hydrocarbons from synthesis gas is well known. It was first implemented on a large scale by the Germans during World War II to make liquid fuels from coal. The general F-T reaction is as follows:

$$CO + 2H_2 \rightarrow -(CH_2)- + H_2O \quad H = -167 \text{ kJ/mole} \quad (1)$$

where $-(CH_2)-$ represents the basic building block of the hydrocarbon products. The FT synthesis is highly exothermic, which leads to heat transfer being a significant factor in the design of an F-T reactor.

A good deal of research has been done on maximizing the synthetic possibilities of the F-T reaction. See, for example, U.S. Pat. No. 6,696,501, which describes a method for converting natural gas or other fossil fuels into higher hydrocarbons. Here, the method uses a combination of steam reforming of fossils fuels to yield synthesis gas, followed by a F-T synthesis and a second steam reforming of the tail gas. The reformed tail gas is then fed back into the F-T reactor.

See also U.S. Pat. No. 6,976,362, which describes a method of integrating synthesis gas generation, an F-T reaction, and a water-gas shift reaction, to yield $CO_2$, aliphatic hydrocarbons, and hydrogen, and then burning the hydrogen in a gas combustor turbine to generate electricity.

As briefly noted above, an important parameter for determining the theoretical maximum yield of synthetic hydrocarbons in a F-T reaction is the stoichiometric number SN, defined as:

$$SN=(H_2-CO_2)/(CO+CO_2) \quad (2)$$

Theoretically, the yield of synthetic hydrocarbons is at its highest when SN=2.0 and CO does not react further to form $CO_2$ via the water gas shift reaction. In this case, the $H_2/CO$ ratio will be equal to SN, i.e. 2.0, which theoretically gives the highest yield of synthetic hydrocarbons.

Biomass is comprised primarily of carbohydrates (e.g., starch and cellulose). One method to convert these compounds to liquid fuels is by fermentation to produce liquid alcohols, such as ethanol and butanol. The technology to convert grain-derived starches to ethanol via hydrolysis, fermentation, and distillation is well established, and advances are being made in the cost-effective conversion of lignocellulosics to ethanol (e.g., through the development of new enzymes for cellulose hydrolysis). The advantages of ethanol as a transportation fuel are that it is a liquid and it has a high octane number (a research octane number of 130). However, ethanol has several notable inherent disadvantages as a fuel as compared to long-chain alkanes: (i) ethanol has a lower energy density compared to petroleum (i.e., approximately $20\times10^3$ BTU/liter for ethanol versus $30\times10^3$ BTU/liter for petroleum); (ii) ethanol is completely miscible with water, leading to significant absorption of water into the fuel; and (iii) it has a relatively low boiling point (73° C.), leading to excessive evaporation at elevated temperatures. Most significantly, however, the fermentation process used to produce bio-ethanol from carbohydrates leads to an aqueous solution containing only about 5 to 10 wt % ethanol. A significant amount of energy is required to distill the ethanol from the water to yield fuel-grade ethanol. Indeed, the overall energy balance for production of bio-ethanol is not very favorable, and it has been estimated that the amount of energy required to produce bio-ethanol is approximately equal to (or greater than) the energy-content of the ethanol produced (11, 12, 36).

Long-chain alkanes comprise the vast majority of components in transportation fuels from petroleum (branched alkanes in gasoline, linear alkanes in diesel). Converting renewable biomass resources to liquid alkanes is therefore an attractive processing option. Most notably, liquid alkanes produced from biomass (i) can be distributed using infrastructure already employed for petroleum-derived products; (ii) can be added to the existing petroleum pool for further processing (e.g., blended fuels); and (iii) can be burned in existing internal combustion engines, without altering the engine or the fuel.

SUMMARY OF THE INVENTION

The invention is a method of making hydrocarbons or oxygenated hydrocarbons, preferably $C_2$ to $C_{36}$ hydrocarbons and/or oxygenated hydrocarbons. In the preferred version of the invention, liquid alkanes (i.e., C5 and longer, linear, branched or cyclic) can be produced directly from biomass-derived compounds, including polysaccharides, monosaccharides, and polyols (e.g., glycerol) via an integrated process involving catalytic conversion to $H_2/CO$ gas mixtures (synthesis gas) and Fischer-Tropsch synthesis (or other carbon-carbon bond-forming reactions). The Fischer-Tropsch synthesis step can be carried out subsequent to the glycerol conversion step, or importantly, both reactions can be coupled by integrating the active sites for each reaction within a single catalyst bed. Thus, in one version of the invention, catalytic conversion of glycerol and Fischer-Tropsch syntheses are coupled in a two-bed reactor system. In the preferred protocol, the conversion of the reactant feedstock to synthesis gas is accomplished using a catalyst comprising Pt—Re on a carbon support. The carbon-carbon bond-forming reaction is then accomplished using a catalyst comprising $Ru/TiO_2$.

In another version of the invention, catalytic conversion of glycerol and Fischer-Tropsch synthesis are coupled in a single reactor, preferably using a single catalyst bed comprising a physical mixture of Pt—Re/C and $Ru/TiO_2$. Alternatively, as described in the Detailed Description, the method can be carried out in a single reactor, but using one, two, or more distinct catalyst beds, each bed containing one or more distinct catalysts. For example, the method can be carried out using a single catalyst bed containing a homogeneous, dual-function catalyst, or the method can be carried out using a single catalyst bed containing two or more catalysts physically mixed together, or the method can be carried out using two or more catalyst beds in a stacked or staged configuration. All of these versions of the invention produce liquid alkanes with $S_{C5+}$ between about 46% and about 64%, with between about 15% and about 50% of the carbon in the products contained in the organic liquid phase. (See the Examples.) The aqueous liquid effluent from the integrated process contains between about 5% and about 15 wt % methanol, ethanol, and acetone, which can be separated from the water via distillation and used in the chemical industry or recycled for conversion to gaseous products. This integrated process significantly improves the economics of "green" Fischer-Tropsch synthesis by reducing capital costs and increasing the thermal efficiency of the reactions. Thus, a notable advantage of the present invention is that it allows for smaller scale Fischer-Tropsch reactors to be incorporated as a component of a bio-refinery. The present invention can also be used to process waste glycerol from bio-diesel plants into liquid fuels. Moreover, the coupling of (a) converting biomass to synthesis gas, and (b) Fischer-Tropsch synthesis leads to synergies in the operations of these processes. Integrating these two reactions into a single reactor avoids the highly endothermic and exothermic steps that result from running the reactions separately.

A notable advantage of the present invention is that by integrating the gasification reaction and the carbon-carbon bond-forming reaction into a "single pot" eliminates the inhibiting effect of CO partial pressure on the rate of the gasification reaction by consuming the CO in the same reactor (in the carbon-carbon bond-forming reaction).

Thus, the invention is a method of fabricating hydrocarbons (preferred), oxygenated hydrocarbons, and other organic compounds. The method comprises performing two reactions, one exothermic and the other endothermic, and integrating the heat from the exothermic reaction to supply (at least in part) the energy required to drive the endothermic reaction. Thus, the method comprises performing an endothermic gasification reaction with a biomass reactant, at a temperature less than or equal to about 750 K, to yield synthesis gas. The method further comprises performing an exothermic carbon-carbon bond-forming reaction (or more generally any exothermic synthesis gas utilization reaction), such as methanol synthesis or dimethylether synthesis) with the synthesis gas produced in the endothermic reaction. The exothermic reaction is performed at a temperature greater than or equal to the temperature of the gasification reaction performed in step (a). In the preferred embodiment, the exothermic reaction produces hydrocarbons (as well as heat). The heat generated from the exothermic synthesis gas utilization or carbon-carbon bond-forming reaction is recycled (i.e., integrated) to provide (at least in part) the energy required to drive the endothermic gasification reaction.

More specifically, the invention is directed to a method of fabricating hydrocarbons and oxygenated hydrocarbons. A first version of the invention comprises performing an endothermic gasification reaction with a biomass reactant (preferably a polysaccharide, a monosaccharide, and/or a polyol) at a temperature less than or equal to about 750 K, to yield synthesis gas. An exothermic synthesis gas utilization reaction or carbon-carbon bond-forming reaction is then performed using the synthesis gas formed in the first step at a temperature greater than or equal to the temperature of the initial gasification reaction. The exothermic reaction produces hydrocarbons or oxygenated hydrocarbons, and heat. The heat generated from the synthesis gas utilization reaction or carbon-carbon bond-forming reaction is then integrated with the endothermic gasification. Thus the heat generated in the exothermic reaction is used to drive (at least in part) the endothermic gasification reaction.

It is preferred that the endothermic gasification reaction be carried out at a temperature less than or equal to about 750 K (and more preferably ≦about 625 K, more preferably still ≦about 575 K, and still more preferably ≦about 550 K). As noted earlier, the reactions may be performed in two separate vessels, or in a single vessel with one, two, or more separate catalyst beds, and using one, two, or more catalysts.

Another version of the invention is a method of fabricating $C_2$ to $C_{36}$ linear or branched hydrocarbons or oxygenated hydrocarbons. The method comprises performing an endothermic gasification reaction with a reactant stream comprising biomass, at a temperature less than or equal to about 750 K (and more preferably ≦about 625 K, more preferably still ≦about 575 K, and still more preferably ≦about 550 K), to yield synthesis gas. An exothermic Fischer-Tropsch reaction is undertaken with the synthesis gas so formed at a temperature greater than or equal to the temperature of the gasification reaction, wherein the reaction produces $C_2$ to $C_{36}$ hydrocarbons and/or oxygenated hydrocarbons, and heat. The heat generated from the Fischer-Tropsch reaction is integrated with the endothermic gasification reaction, thus making the entire process very energy efficient.

It is very much preferred that the endothermic gasification reaction be run at a temperature that is optimized for the synthesis gas utilization or carbon-carbon bond-forming reaction. This condition results in an overall, integrated reaction that is most efficient in terms of matching the heat generated by the exothermic reaction with the heat required by the endothermic reaction. Thus, where the exothermic reaction is a Fischer-Tropsch reaction, it is preferred that both the Fischer-Tropsch reaction and the gasification reaction be run at a temperature optimized for the Fischer-Tropsch reaction.

In the preferred version of the invention, both the endothermic gasification reaction and the exothermic synthesis gas utilization or carbon-carbon bond-forming reaction are performed simultaneously in a single reactor vessel. Alternatively, the two reactions may be run in separate reaction vessels, with the heat generated in the exothermic reaction being recycled to supply heat to the endothermic gasification reaction. The reactor can be of any design now known or developed in the future, so long as the reactor design enables the heat of the exothermic reaction to be integrated with the endothermic reaction. Designing reactor systems to maximize heat integration between two or more reactions is well known in the art and will not be discussed in any detail herein. See, for example, references (33) and (34).

The preferred feedstock for the endothermic gasification reaction comprises biomass or compounds derived from biomass, including, but not limited to, cellulosics, lignocellulosics, polysaccharides, monosaccharides, polyols, and the like. The preferred feedstock comprises monosaccharides and/or glycerol. As used herein, the term "biomass" refers to the organic materials produced by plants, such as leaves, roots, seeds, and stalks, as well as microbial and animal metabolic wastes (e.g., manure), without limitation. Common sources of biomass include (without limitation): (1) agricultural wastes, such as corn stalks, straw, seed hulls, sugarcane leavings, bagasse, nutshells, and manure from cattle, poultry, and hogs; (2) wood materials, such as wood or bark, sawdust, timber slash, and mill scrap; (3) municipal waste, such as waste paper and yard clippings; and (4) energy crops, such as poplars, willows, switch grass, alfalfa, prairie bluestem, corn, soybean, and the like. The term "biomass-derived reactant" refers to any reactant that can be fabricated from biomass by any means now known or developed in the future, including (without limitation) polysaccharides, monosaccharides, polyols, oxygenated hydrocarbons, sugars, starches, and the like, for example, ethanediol, ethanedione, glycerol, glyceraldehyde, aldotetroses, aldopentoses, aldohexoses, ketotetroses, ketopentoses, ketohexoses, and alditols.

The preferred exothermic, carbon-carbon bond-forming reaction is a Fischer-Tropsch reaction. The gasification reaction may be performed using one or more catalysts comprising a Group VIIIB metal (Fe, Co, Ni, Ru, Rh, Pd, Os, Ir, and Pt) or any of the catalysts listed in the Detailed Description. The catalysts may be unsupported or supported on any suitable support. (See the Detailed Description for a list of exemplary supports.)

In the preferred version of the invention, the endothermic gasification reaction is performed using a reactant feed stock comprising glycerol, and the exothermic synthesis gas utilization or carbon-carbon bond-forming reaction is a Fischer-Tropsch reaction. Other exothermic reactions (such as methanol synthesis or dimethylether synthesis) may also be utilized.

To match the temperatures of the two reactions more closely, it is preferred that the gasification reaction is performed using at least one catalyst comprising a Group VIIIB metal or a combination of Group VIIIB metals, and more preferably still at least one catalyst comprising platinum, ruthenium, rhenium (a Group VIIB metal) or a combination thereof. The catalyst may optionally be disposed on a support, which is generally preferred because these supported catalysts tend to be more stable over time (see the Detailed Description). Any suitable support may be used. Preferred supports include, without limitation, carbon, as well as oxides of aluminum, cerium, zirconium, and magnesium, and combinations of any of these. The most preferred version of the invention utilizes one or more catalysts comprising platinum, ruthenium, a combination of platinum and ruthenium, or a combination of platinum and rhenium, and the catalyst is disposed on a support selected from the group consisting of carbon, $Al_2O_3$, $CeO_2$, $ZrO_2$, MgO, ZrO, and combinations thereof.

Thus, in the present invention biomass-derived reactants are converted to gas mixtures of $H_2$ and CO (i.e., synthesis gas or "syngas"); the synthesis gas is used to produce fuels and chemicals by Fischer-Tropsch reaction, methanol syntheses, or other carbon-carbon bond-forming reactions. In the preferred version, the synthesis gas is produced from glycerol over catalyst(s) comprising platinum. As shown in the Examples provided herein, the present method yielded synthesis gas with high rates and high selectivities, at temperatures that are significantly lower compared to conventional gasification of biomass. In the present invention, at least a portion of the endothermic heat for the synthesis gas generation step is supplied from the exothermic heat of the carbon-carbon bond-forming reaction. In the present invention, the temperature ranges for these catalytic processes are made to overlap or very nearly overlap, a novel feature in the field of fabricating organic compounds using a synthesis gas feed stock. Thus, the present invention provides an energy-efficient route for producing fuels and chemicals from renewable biomass resources in general, and from glycerol in particular.

Producing synthesis gas from biomass has been recognized for years as a promising platform from which a variety of valuable products can be made. However, conventional production of syngas from biomass requires very high temperatures, which limits the efficiency of the overall process. As shown herein, the catalytic production of synthesis gas from biomass (glycerol in particular) can be made to take place at temperatures (about 550 K to less than about 750 K, and preferably less than about 620 K) that are significantly lower than those employed using conventional direct catalytic gasification of biomass (at 800 K) (4) or using conventional two-stage gasification of biomass, which involves a fast pyrolysis of biomass (at 773 K) (5, 6), followed by steam reforming of the resulting bio-oil (at 1000 K).

Importantly, in the present invention the low temperatures of the gasification step overlaps or nearly overlaps the temperatures employed for Fischer-Tropsch and methanol syntheses (synthesis gas utilization reactions in general). As a result, at least a portion (and potentially all) of the heat required for the endothermic gasification step can be supplied from the heat generated by the highly exothermic synthesis gas utilization or carbon-carbon bond-forming reactions. In particular, the gasification of glycerol (the preferred reactant) to produce CO and $H_2$ takes place by the following stoichiometric reaction:

$$C_3O_3H_8 \rightarrow 3CO + 4H_2 \quad (3)$$

The endothermic heat of this reaction corresponds to about 24% of the heating value of the glycerol. The exothermic heat generated by converting the CO and $H_2$ from glycerol to produce liquid alkanes (e.g., octane) from Fischer-Tropsch synthesis corresponds to about 28% of the heating value of the glycerol. (This number includes the small amount of heat liberated during water-gas shift ($CO+H_2O \rightarrow CO_2+H_2$) to adjust the $H_2$:CO gas ratio in accord with the stoichiometry of the overall reaction.) Integrating the gasification reaction and the Fischer-Tropsch synthesis steps therefore leads to the following slightly exothermic process, with a heat that is only about 4% of the heating value of the glycerol:

$$C_3O_3H_8 \rightarrow \frac{7}{25}C_8H_{18} + \frac{19}{25}CO_2 + \frac{37}{25}H_2O \quad (4)$$

Thus, a very notable advantage of the present invention is that the gasification reaction will function using a feed stock having a high concentration of glycerol (25% by weight and higher). Thus, the present invention is commercially attractive for creating value-added organic compounds from the large (and growing) amounts of glycerol that are created as a by-product of bio-diesel production. In particular, the synthesis gas produced from glycerol can be used to produce methanol, an important reactant in the transesterification process, thereby decreasing the bio-diesel production cost by utilizing the glycerol by-product.

As detailed below, it is generally preferred to use phase reaction conditions achieved by vaporizing concentrated aqueous solutions of glycerol (e.g., 25-50 wt %), leading to low partial pressures of water.

BRIEF DESCRIPTION OF THE FIGURES

FIG. 3A depicts a single-reactor, single-bed arrangement. FIG. 3B depicts a single-reactor, multiple-bed arrangement; FIG. 3C depicts a two-reactor arrangement.

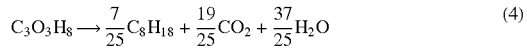

Figure 6:
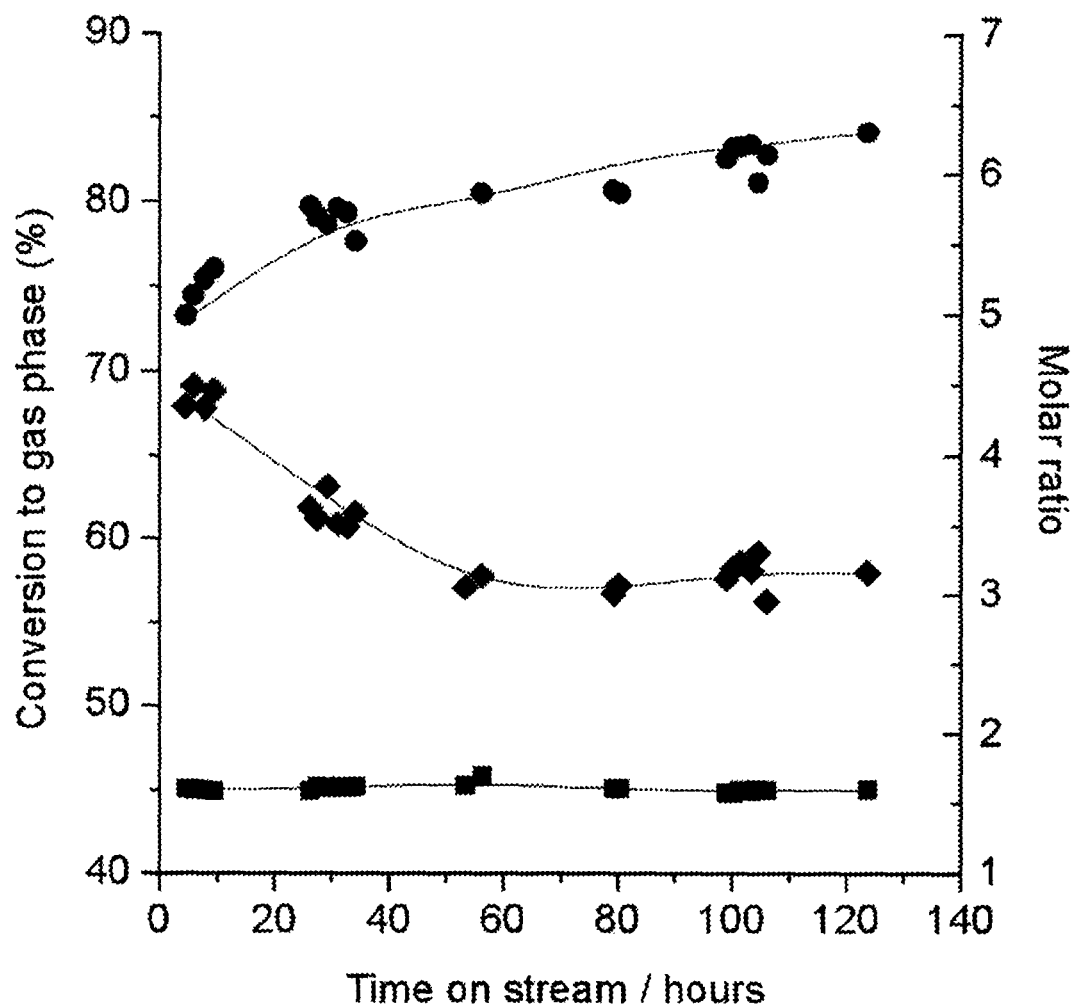

FIG. 6 is a graph depicting the conversion to gas phase products (♦), $CO/CO_2$ molar ratio (●), and $H_2$/CO molar ratio (■) for gas-phase processing of 30 wt % aqueous-glycerol feed at 548 K and 8.3 bar. Conversion to gas phase was calculated as (C atoms in gas phase product stream/total C into reactor as feed)×100. The reactions were carried out using 0.08 cm³ min⁻¹ of feed solution over 520 mg of catalyst.

Figure 7:
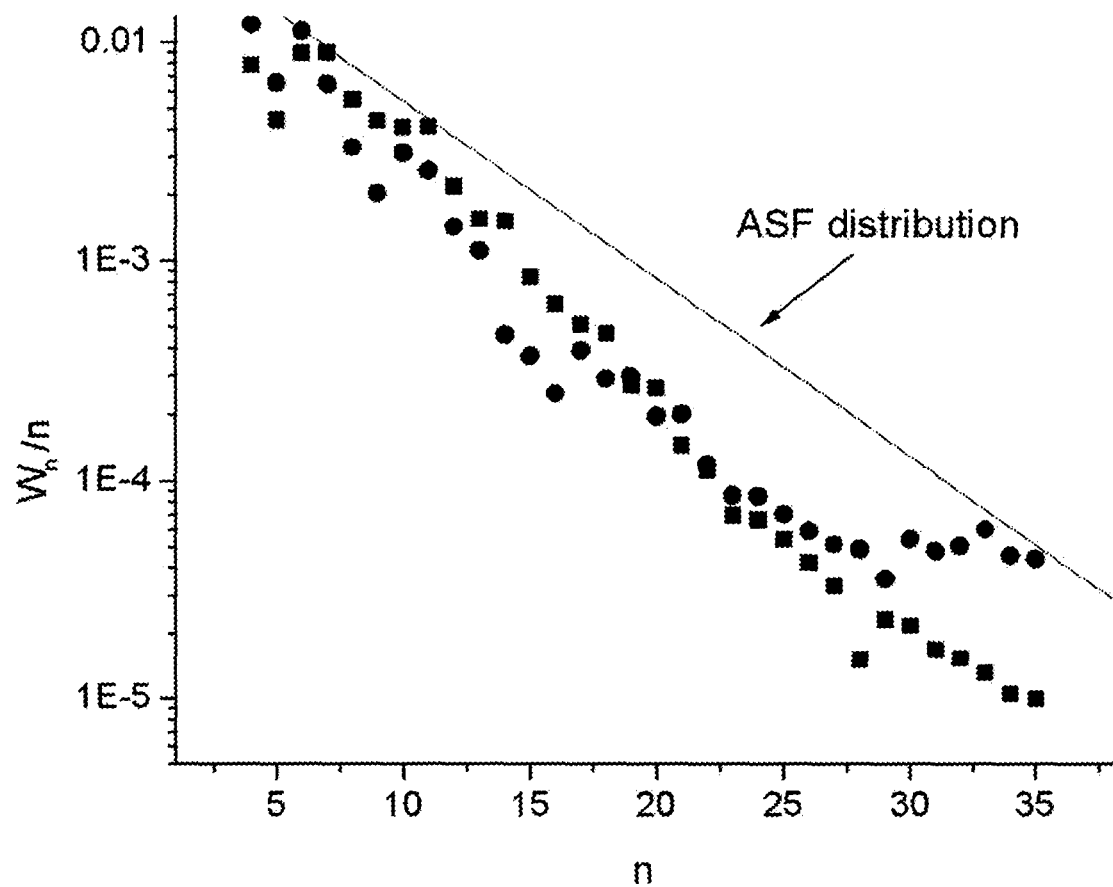

FIG. 7 is a graph depicting the molecular weight distributions for the combined glycerol conversion with Fischer- Tropsch synthesis experiments using 1.0 g Pt—Re/C with 1.7 g Ru/TiO2 (■) and 3.0 g Ru/TiO2 (●). ASF line plotted with α=0.8.

DETAILED DESCRIPTION

At the heart of the present invention is a reaction protocol which matches the temperature of an endothermic gasification reaction with the optimum temperature for an exothermic carbon-carbon bond-forming reaction (e.g., Fischer-Tropsch) or more generally the synthesis gas utilization reaction (for example, methanol synthesis or dimethylether synthesis). By judiciously selecting the reaction conditions and the catalysts for each reaction, the two reactions can be made to perform at optimum levels at about the same temperature (or at relatively close temperatures). The heat from the exothermic carbon-carbon bond-forming reaction is then used to drive the endothermic gasification reaction.

Thus, FIG. 1 shows results for the performances of various supported Pt catalysts for gas-phase reforming at 623 K and atmospheric pressure using a feed solution comprising 30 wt % glycerol in water. Catalysts comprising Pt supported on $Al_2O_3$, $ZrO_2$, $CeO_2/ZrO_2$, and $MgO/ZrO_2$ exhibited relatively rapid deactivation during time-on-stream. Thus, while these catalysts can be used in the present invention, they are not preferred. The Pt/C catalyst showed stable conversion of glycerol to synthesis gas for at least 72 h. See FIG. 1A. The catalyst with the most acidic support reported here, $Pt/Al_2O_3$, showed a period of stable catalytic activity during the first 30 hours, followed by a period of rapid catalyst deactivation. This behavior is characteristic of a deactivation front that moves from the reactor inlet to the outlet, and the onset of rapid deactivation occurs when the front reaches the exit of the reactor. The most basic catalyst support tested here, $MgO/ZrO_2$, showed rapid deactivation for all times-on-stream. The most stable oxide-supported catalyst tested appears to be Pt on $CeO_2/ZrO_2$. However, the performance of this catalyst is still less preferred than Pt supported on carbon.

Figure 1A:
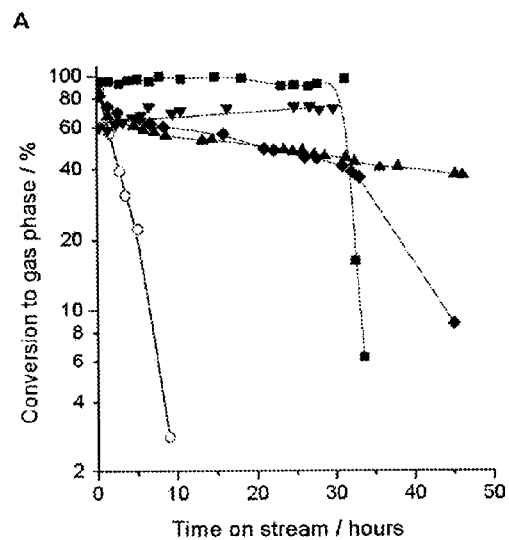
FIGS. 1A, 1B, 1C, and 1D are graphs depicting variation of conversion to gas phase products (FIG. 1A), $H_2$ turnover frequency (FIG. 1B), $CO/CO_2$ molar ratio (FIG. 1C), and $C_2$ to $H_2$ ratio×100 (FIG. 1D) for Pt catalysts supported on $Al_2O_3$ (■), $CeO_2/ZrO_2$ (▲), C (▼), $ZrO_2$ (♦), and MgO/ZrO (○). Conversion to gas phase is calculated as (carbon atoms in gas phase product stream÷total carbon atoms into reactor as feed)×100. The reactions were performed at 1 bar and 623 K with 0.32 cm³ min⁻¹ of 30 wt % aqueous-glycerol feed solution over 1.0 g of oxide-supported Pt catalysts or 0.060 g of Pt/C catalyst. ▼* indicates point after 72 hours time-on-stream.
Figure 1B:
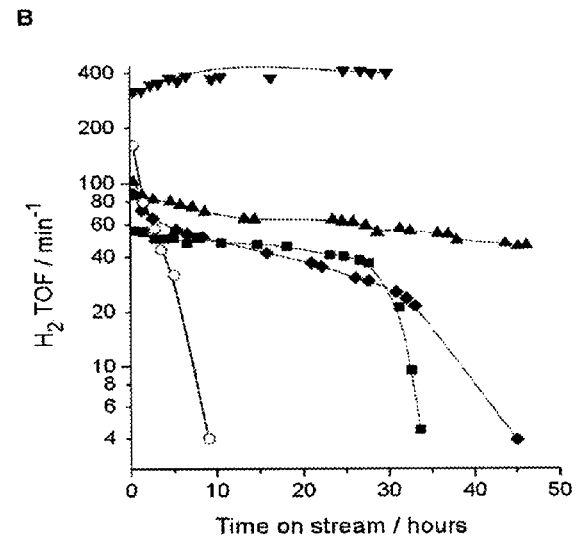

FIG. 1B shows the rates of $H_2$ production on the various catalysts, expressed as turnover frequencies (TOF), where the rates have been normalized by the number of surface Pt atoms as determined by the saturation adsorption of CO at 298 K. The turnover frequencies for hydrogen production determined in this manner are higher (e.g., by a factor of at least 10) than the values for hydrogen generation by aqueous phase reforming at 500 K over an alumina-supported Pt catalyst (see, for example, 19). The rate of $H_2$ generation from glycerol over the Pt/C catalyst corresponds to approximately 160 Watts of power generation per gram of catalyst (using the lower heating value of $H_2$). Because this catalyst is producing gas with a $H_2$:CO ratio of approximately 1.3, the energy content of the effluent gas corresponds to approximately 300 Watts per gram of catalyst.

Figure 1C:
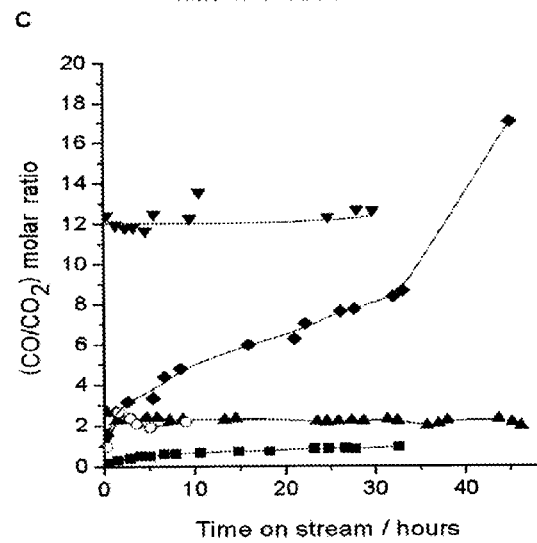

The different deactivation profiles displayed in FIGS. 1A and 1B for the various catalysts tested suggest that the support plays an important role in the deactivation process. The $H_2$:CO ratio for the product stream from the Pt/C catalyst is equal to approximately 1.3 (see Table 1), which is in agreement with the stoichiometry of reaction 3. In contrast, the $H_2$:CO ratios obtained over the other catalysts were greater than 1.5, indicating the contribution of other reactions, such as the water-gas shift (WGS). This behavior is demonstrated more clearly by the $CO:CO_2$ ratio, as shown in FIG. 1C. The initial $CO:CO_2$ ratio for Pt/C is 12, while it is less than 3 for the other catalyst. Thus, it appears that the WGS reaction is facilitated by the presence of the oxide support, as reported in other studies of the WGS reaction over supported metal catalysts (22-24). It also appears from FIG. 1C that the rate of WGS over the $Pt/ZrO_2$ catalyst deceases with time-on-stream.

Figure 1D:
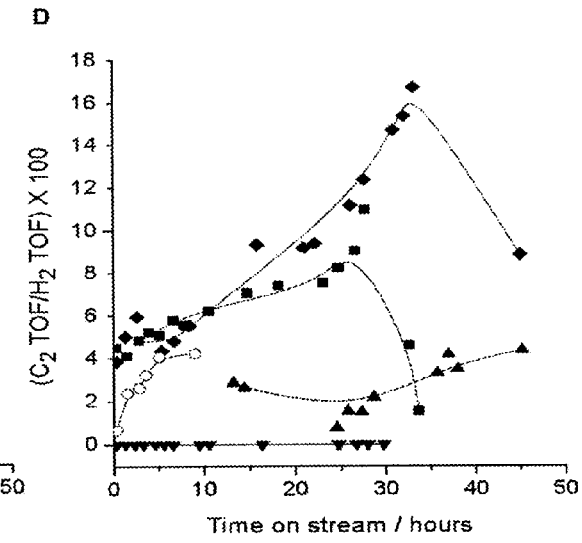

FIG. 1D shows the rate of formation of $C_2$-hydrocarbons (ethane and ethylene) normalized by the rate of $H_2$ production for the various supported Pt catalysts (where this ratio is multiplied by 100). Only small amounts of $C_2$-hydrocarbons were formed on the Pt/C catalyst. In contrast, catalysts comprising Pt supported on the various oxide supports formed significant amounts of $C_2$-hydrocarbons, and the ($C_2$-TOF):($H_2$-TOF) ratio appears to increase with time-on-stream. This behavior suggests that one of the modes of catalyst deactivation is caused by dehydration processes occurring on the oxide catalyst supports. While not being bound to any specific underlying mechanism, this presumably leads to the formation of unsaturated hydrocarbon species that form carbonaceous deposits on the Pt surface, thereby decreasing the rate of $H_2$ production and increasing the ($C_2$-TOF):($H_2$-TOF) ratio.

Table 1 shows the performance of the Pt/C catalyst under various reaction conditions. Conditions leading to lower conversions of glycerol (i.e., higher flow rates of the 30 wt % glycerol feed and higher glycerol concentrations at constant feed flow rate) lead to higher $CO:CO_2$ ratios. This behavior suggests that the primary reaction in glycerol conversion using this catalyst system is the formation of CO and $H_2$, and the production of $CO_2$ by WGS is a secondary reaction. The rate of methane formation remained low for all of the conditions in Table 1.

TABLE 1

Experimental Data for Catalytic Conversion of Glycerol at Various Conditions.

| Process Conditions | | Conversion to gas phase (%) | $H_2$ TOF (min$^{-1}$) | $H_2$/ CO | CO/ $CO_2$ | $CH_4$/ $H_2$ |
|---|---|---|---|---|---|---|
| Feed flow rate ($cm^3 min^{-1}$)$^a$ | 0.08 | 68 | 111 | 1.6 | 5.7 | 0.038 |
| | 0.16 | 71 | 241 | 1.4 | 8.8 | 0.036 |
| | 0.32 | 64 | 373 | 1.3 | 12 | 0.045 |
| | 0.64 | 39 | 449 | 1.3 | 17 | 0.038 |
| Glycerol concentration (wt %)$^b$ | 20 | 64 | 265 | 1.4 | 8.7 | 0.025 |
| | 30$^c$ | 50 | 285 | 1.3 | 14 | 0.032 |
| | 50 | 26 | 267 | 1.2 | 37 | 0.050 |
| Temperature (K)$^d$ | 573 | 17 | 104 | 1.31 | 90 | 0.037 |
| | 623 | 54 | 335 | 1.31 | 17 | 0.027 |
| | 673 | 100 | 600 | 1.33 | 11 | 0.027 |
| | 673$^e$ | 72 | 450 | 1.38 | — | — |
| | 723 | 61 | 419 | 1.68 | 4.6 | 0.019 |
| | 723$^e$ | 43 | 300 | 1.83 | — | — |

For the reaction kinetics studies in Table 1, 0.060 g of 5 wt % Pt/C was used.
$^a$Glycerol feed concentration of 30 wt %, 623 K, and 1 bar.
$^b$Feed flow rate of 0.32 cm$^3$ min$^{-1}$, 623 K, and 1 bar.
$^c$Point taken after 2 h time-on-stream.
$^d$Glycerol feed concentration of 30 wt % at 0.32 cm$^3$ min$^{-1}$ and 1 bar.
$^e$Point taken after 3 h time-on-stream.

The results in Table 1 show that the rate of $H_2$ production passes through a maximum with respect to reaction temperature at constant feed conditions. The rate increases with increasing temperature from 573 to 623 K, consistent with an activation energy barrier of about 75 kJ/mol. In contrast, while the rate of hydrogen production increases further when the temperature is initially increased to 673 K, the Pt/C catalyst begins to undergo deactivation versus time-on-stream at this higher temperature. It is presumed that dehydration processes are too fast compared to $H_2$ formation reactions at higher temperatures, leading to catalyst deactivation.

Figure 2A:
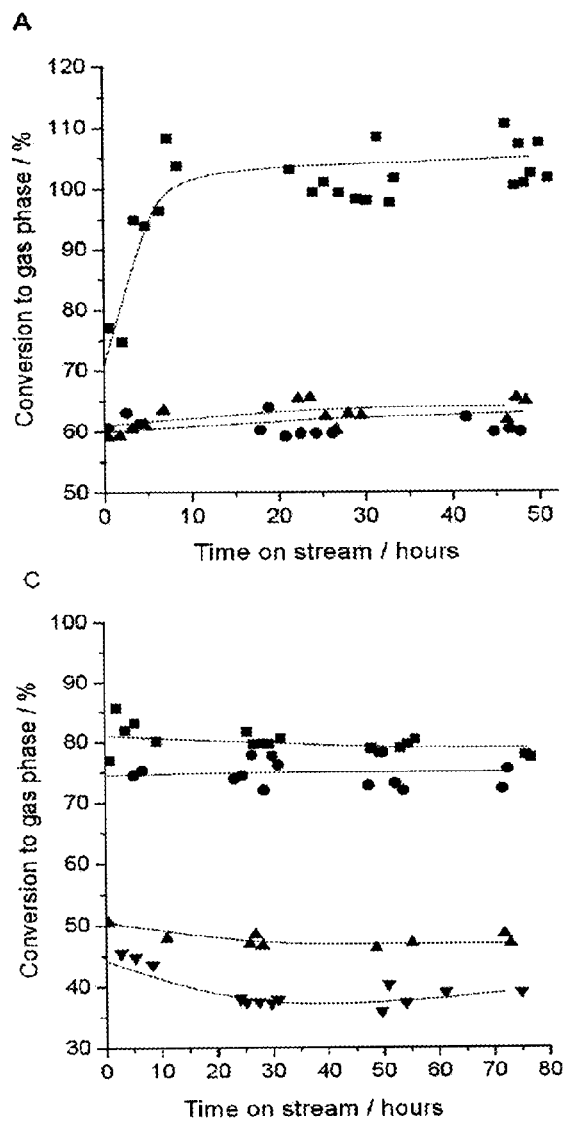
FIGS. 2A, 2B, 2C, and 2D are graphs depicting variation of glycerol conversion to gas phase products (FIG. 2A) and molar ratios for gas phase reforming of 30 wt % glycerol (FIG. 2B) at 1 bar (■), 50 wt % glycerol at a 1 bar (▲), and 30 wt % glycerol at 20 bar (●) over 0.090 g Pt/C at 623 K. Variation of glycerol conversion to gas phase products (FIG. 2C) and molar ratios ($CO/CO_2$=closed symbols; $H_2$/CO=open symbols) for gas phase reforming of 30 wt % glycerol (FIG. 2D) at 1 bar over Pt:Ru/C at 548 K (triangles: 0.435 g catalyst) and 573 K (squares: 0.513 g catalyst) and over Pt:Re/C at 498 K (inverse triangles: 0.535 g catalyst) and 523 K (circles: 0.535 g catalyst). Liquid feed rate of 0.16 cm³ min⁻¹ for FIGS. 2A and 2B, and 0.08 cm³ min⁻¹ for FIGS. 2C and 2D.
Figure 2B:
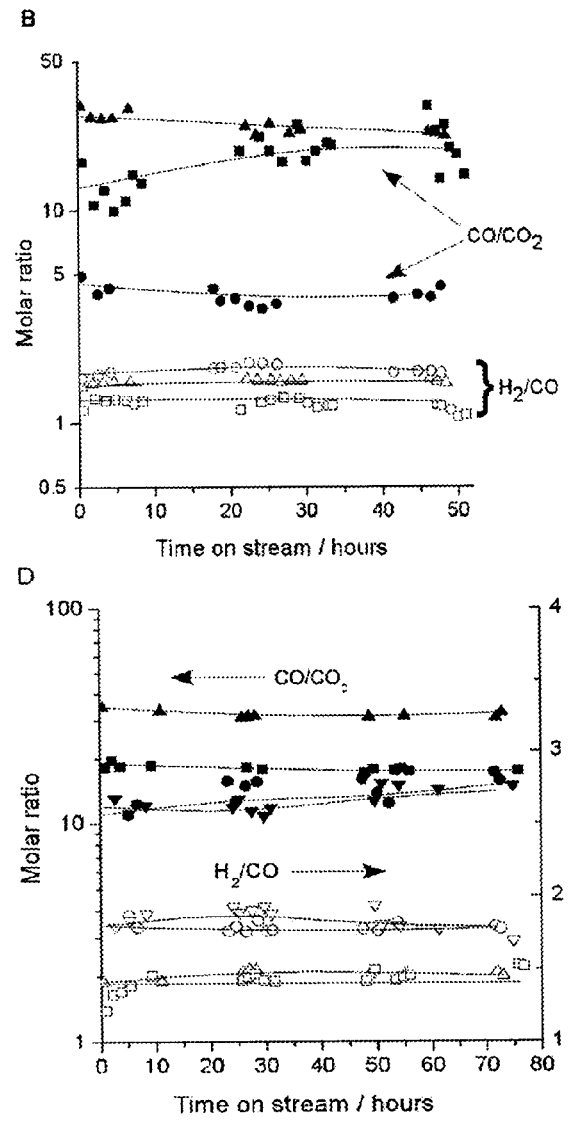

FIGS. 2A and 2B show the performance of the Pt/C catalyst at increased pressure (from 1 to 20 bar) for the 30 wt % glycerol feed, and for increased glycerol feed concentration (from 30 to 50 wt %) at a pressure of 1 bar. The catalyst showed good stability for at least 48 h time-on-stream for both the higher glycerol feed concentration (50 wt %) and the higher reaction pressure (20 bar). Of critical note is that the Pt/C catalyst shows excellent stability for converting a 30 wt % glycerol feed to produce synthesis gas at 20 bar with a $H_2$:CO ratio (equal to approximately 2) that is appropriate for subsequent Fischer-Tropsch (2) or methanol synthesis (3).

Figure 2C:
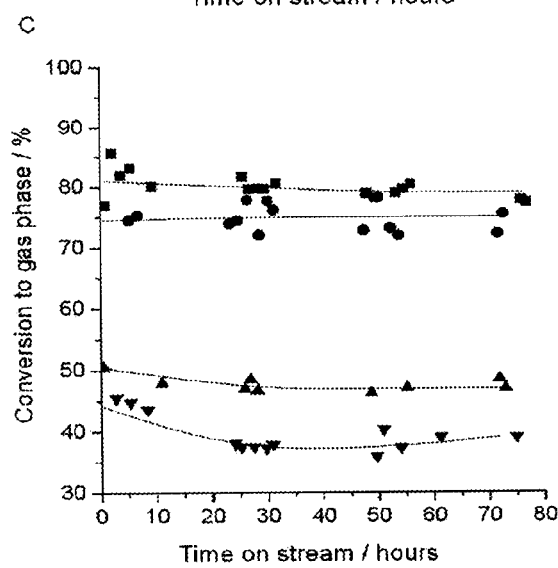
Figure 2D:
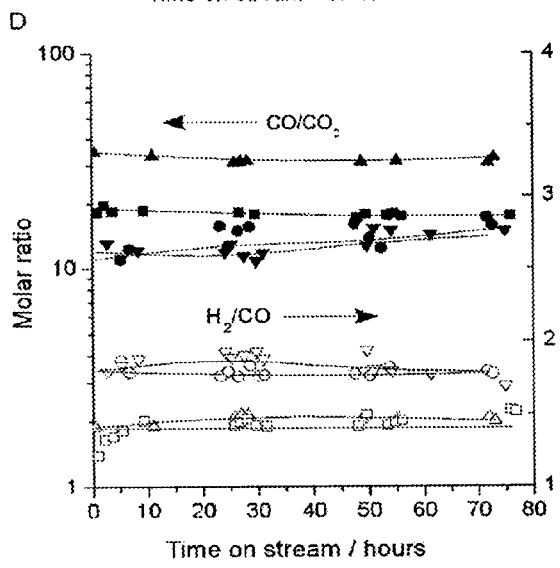

To achieve efficient heat transfer from the exothermic Fischer-Tropsch or methanol synthesis steps (or the synthesis gas utilization step in general) to the endothermic gasification step, it is beneficial to operate the gasification step at the lowest possible temperature. Therefore, the studies of glycerol gasification described in the Examples were carried out at 548 and 573 K, temperatures where the rate is low because of surface poisoning by strongly adsorbed CO. To achieve high conversions of glycerol at these low temperatures, a bimetallic catalyst comprising Pt:Ru was chosen (with a Pt:Ru atomic ratio of 1:1), along with a bimetallic catalyst comprising Pt:Re (with a Pt:Re atomic ratio of 1:1), because the presence of Ru and Re decrease the strength of CO adsorption (25). FIGS. 2C and 2D show that the conversion of glycerol, as well as the $CO:CO_2$ and $H_2/CO$ ratios, remain constant for at least 72 h time-on-stream at these low temperatures over the Pt:Ru/C and the Pt:Re/C catalysts. The overall carbon balances for these runs closed to within 5%, and the main condensable organic species in the effluent stream was unconverted glycerol (73 mol % and 35 mol % at 548 K and 573 K, respectively), with smaller amounts of methanol (4 mol % and 15 mol % at 548 K and 573 K, respectively) and acetic acid (20 mol % and 40 mol % at 548 K and 573 K, respectively).

Thus, in the present invention, the heat liberated from a carbon-carbon bond-forming reaction or an exothermic synthesis gas utilization reaction in general (and preferably a F-T reaction) is recycled to provide (at least in part) the energy required for a biomass gasification reaction in general (and preferably a glycerol gasification reaction). Of particular advantage is that the two reactions can be performed in a single reactor, such as those shown in FIG. 3A and FIG. 3B.

These results demonstrate that the gasification of biomass in general, and glycerol in particular can, in fact, be operated at temperatures well within the temperature ranges employed for Fischer-Tropsch and methanol syntheses (2, 3, 26), allowing for efficient heat integration between these processes. Moreover, the $H_2/CO$ ratio can be adjusted by adding a second catalyst bed that is effective for the WGS, as is illustrated in the Examples. Note that the rate of $H_2$ production at 573 K over Pt:Ru/C (FIGS. 2C and 2D) is lower than the rate over Pt/C (Table 1) because higher glycerol conversions and higher CO partial pressures were achieved over the Pt:Ru/C catalyst.

The invention is thus a low-temperature catalytic process for gasification of glycerol to produce $H_2$:CO gas mixtures that are suitable for subsequent Fischer-Tropsch and methanol syntheses (or exothermic synthesis gas utilization steps in general). The products of the gasification reaction can be utilized directly in the carbon-carbon bond-forming reaction, without any intervening treatment. (Of course, this is necessarily the case when the two reactions are carried out in a single reactor vessel, rather than in two separate reactors.) The invention opens new opportunities for heat integration between the gasification and synthesis gas utilization steps. This system achieves stable operation over long periods of time and provides a new direction for producing fuels and chemicals from renewable sources.

To demonstrate the performance of a carbon-supported Pt—Re catalyst at high pressure, a feed solution containing 30 wt % glycerol in water was converted to synthesis gas at 548 K and 8.3 bar over 10 wt % Pt—Re (atomic ratio 1:1)/C. After a period of 60 h, during which the conversion of glycerol to gas-phase products decreased from 68% to 57%, the catalyst showed excellent stability for an additional 60 h time-on-stream (see the Examples and FIG. 6). The gas-phase effluent comprises synthesis gas with a $H_2$:CO ratio equal to 1.6, which can be adjusted via the water-gas shift reaction to reach the 2:1 ratio appropriate for Fischer-Tropsch synthesis (37). The balance of the gaseous products comprise $CO_2$ ($CO:CO_2$ molar-ratio of about 6) and light alkanes ($C_1$-$C_3$, with a CO:alkanes carbon ratio of about 10). At 548 K and 5 bar, the gas-phase product distribution and catalytic stability were similar, and the conversion to gas-phase products was approximately 80%. The remaining glycerol was converted to liquid products such as methanol, ethanol, n-propanol, ethylene glycol, 1,2 propanediol, acetone, and acetol, all of which can be converted to $H_2/CO$ gas mixtures containing small amounts of alkanes (17). The carbon balance closed to within about 10%. See the Examples for a description of the liquid phase product distribution.

To couple the conversion of glycerol to synthesis gas with a Fischer-Tropsch synthesis in a two-bed reactor requires exposure of the down-stream Fischer-Tropsch catalyst to water vapor from the aqueous glycerol feed. Initial experiments using a 30 wt % glycerol feed with a two-bed system, comprising a Pt—Re/C catalyst followed by a Co-based Fischer-Tropsch catalyst, showed a relatively low activity for liquid alkane formation. Iglesia, et al. report that small amounts of water can improve the performance of Co-based Fischer-Tropsch catalysts (38). However, the highest water partial pressure in the Iglesia et al. study ($P_{H2O}$:$P_{CO}$=3) was lower than that which results from conversion of a 30 wt % glycerol feed ($P_{H2O}$:$P_{CO}$=8). Also, the studies by Iglesia et al. (38) were conducted at higher total pressure (20 bar). Therefore, in the present invention, it is advantageous to decrease the ratio of water to CO. Thus, the Pt—Re/C catalyst was tested on 50 wt % and 80 wt % glycerol solutions between 1-11 bar. Table 2 shows the conversion to gas phase products as well as the $H_2$:CO and $CO:CO_2$ molar ratios.

TABLE 2

Performance of Pt-Re/C for the conversion of concentrated glycerol in water solutions to synthesis gas at various pressures. Conversion to gas phase products calculated as (C atoms in gas phase product stream/total C into reactor as feed) × 100. Reaction carried out using ~0.04 $cm^3$ $min^{-1}$ of feed over 1.0 g catalyst at 548 K.

| Feed concentration (wt %) | Pressure (bar) | $H_2$:CO | $CO:CO_2$ | Conversion to gas phase products (%) |
|---|---|---|---|---|
| 80 | 1 | 1.4 | 23 | 86 |
| 50 | 1 | 1.6 | 11 | 96 |
| 80 | 5 | 1.2 | 13 | 56 |
| 50 | 5 | 1.5 | 7.8 | 76 |
| 80 | 11 | 1.0 | 5.0 | 44 |
| 50 | 11 | 1.4 | 2.7 | 55 |

The conversion to gas phase products increases with decreasing concentration of glycerol in the feed at constant pressure and decreases with increasing pressure at constant feed concentration. The water gas shift activity increases at higher pressures and/or lower feed concentrations because of the increased partial pressure of $H_2O$, as evidenced by the decrease in the $CO:CO_2$ ratio. These experiments were carried out at 548 K and pressures above the dew point for 50 wt % and 80 wt % glycerol feed solutions. However, each condition tested showed stable operation for approximately 20 h time-on-stream, and there was only a 6% loss in activity after operation at 11 bar with 80 wt % glycerol feed. The liquid phase contained oxygenated hydrocarbon products similar to those for the conversion of a 30 wt % glycerol feed. The liquid product distribution for each condition in Table 2 is provided in the Examples.

The product distributions for the conversion of aqueous glycerol solutions at various pressures are consistent with the reaction scheme proposed by Cortright, et al. (17) for the aqueous phase reforming of polyols. The reaction scheme comprises glycerol adsorption-dehydrogenation, C—C bond cleavage, and desorption of CO and $H_2$. Water-gas shift of adsorbed CO leads to $CO_2$ production, and cleavage of C—O as opposed to C—C bonds results in the formation of alkanes and alcohols (17). The liquid phase products can be condensed from the synthesis gas and then recycled for further conversion to gaseous products.

To achieve energy integration between the endothermic conversion of glycerol to synthesis gas and the exothermic conversion of synthesis gas to liquid alkanes, the temperature for the Fischer-Tropsch synthesis step must be comparable to (or higher than) that employed in the glycerol conversion step. Also, the pressures at which both reactions are conducted should be similar to minimize compression costs. (That is, the reactions can be performed at different pressures, but the energy required to compress the gasses for the higher-pressure reaction will decrease the energy efficiency of the overall process.) Furthermore, when the synthesis gas from the glycerol conversion step is fed directly to the Fischer-Tropsch catalyst, the catalyst will be exposed to water and oxygenated hydrocarbon by-products. Therefore, a series of Fischer-Tropsch synthesis experiments were conducted at 548 K and 5 bar over 4 g of 2.9 wt % $Ru/TiO_2$ catalyst with 150 $cm^3$ $min^{-1}$ of dry synthesis gas ($H_2:CO=2$) and with co-feeds of water or aqueous solutions of acetol, ethanol, or acetone (the most abundant liquid phase products from glycerol conversion) to simulate the conditions of a two-bed reactor system that processes an 80 wt % glycerol feed at 5 bar. A Ru-based Fischer-Tropsch catalyst was used because a Co-based catalyst showed low activity during initial experiments. Table 3 lists the conversion of CO and selectivities to $CH_4$, $CO_2$, and $C_{5+}$ hydrocarbons for these Fischer-Tropsch synthesis experiments.

The conversion of CO is about 50% for Fischer-Tropsch synthesis with dry synthesis gas. Adding water to the synthesis gas feed increases the selectivity to $CO_2$, most likely by an increase in the rate of water-gas shift; however, the conversion of CO and the activity (as defined by the site time yield) remain similar to the dry synthesis gas experiment. The conversion and activity both decrease slightly with the addition of oxygenated hydrocarbons to the synthesis gas. It is possible that adsorbed species from these molecules inhibit the Fischer-Tropsch reaction by blocking Ru sites for CO and $H_2$ adsorption. This decrease in activity could be the reason for the lower $CO_2$ selectivities with oxygenated hydrocarbon co-feeds compared to with the water co-feed. The selectivity to $C_{5+}$ hydrocarbons slightly increases with the addition of oxygenated feed molecules compared to dry synthesis gas feed, while the selectivities to methane and $CO_2$ are unchanged. The only exception is that the selectivity to methane decreases by more than a factor of two (2) with the addition of acetol. Acetol reacted readily upon addition to the Fischer-Tropsch reactor. All of the acetol reactant feed yielded products, with 30% being converted to acetone, methanol, and ethanol in the aqueous product phase and 20% being converted to oxygenated species in the organic product phase (mostly hexanones). Another 10% of the acetol feed was converted to gaseous acetone. Therefore, about 40% of the carbon fed to the reactor as acetol entered into Fischer-Tropsch chain growth and was converted into liquid hydrocarbons. These results indicate that the water and oxygenated hydrocarbons in the synthesis gas produced in the glycerol conversion process have little effect on the selectivity of the Fischer-Tropsch catalyst. In the case of acetol, this oxygenated hydrocarbon appears to have a synergistic effect by adding to the hydrocarbon chain growth. Therefore, the work described herein demonstrates the

TABLE 3

Results of Fischer-Tropsch synthesis over 4 g of 2.9 wt % $Ru/TiO_2$ at 548 K. Reaction carried out using ~150 $cm^3$ $min^{-1}$ synthesis gas ($H_2:CO = 2$).

| Oxygenated feed molecule | $P_{CO}$ (bar) | $P_{H2}$ (bar) | $P_{H2O}$ (bar) | P oxygenate (bar) | Total P (bar) | GHSV $(h^{-1})^a$ | $X_{CO}$ $(\%)^b$ | Site time yield $(min^{-1})^c$ | $S_{C5+}{}^d$ | $S_{CH4}$ | $S_{CO2}$ |
|---|---|---|---|---|---|---|---|---|---|---|---|
| — | 1.7 | 3.3 | — | — | 5 | 410 | 53 | 2.7 | 0.29 | 0.35 | 0.09 |
| Water | 1.7 | 3.5 | 2.9 | — | 8.1 | 630 | 55 | 2.8 | 0.23 | 0.32 | 0.23 |
| Acetol/Water | 1.8 | 3.5 | 2.6 | 0.2 | 8.1 | 630 | 30 | 1.5 | 0.38 | 0.15 | 0.05 |
| Ethanol/Water | 1.9 | 3.7 | 2.2 | 0.3 | 8.1 | 590 | 32 | 1.7 | 0.34 | 0.35 | 0.10 |
| Acetone/Water | 1.9 | 3.8 | 2.1 | 0.3 | 8.1 | 570 | 26 | 1.4 | 0.32 | 0.35 | 0.11 |

$^a$Gas hourly space velocity (GHSV) calculated as total volumetric flow rate into the reactor divided by the volume of the catalyst bed (39)
$^b$Conversion of CO is calculated as, $[(F_{CO})_{In} - (F_{CO})_{Out}/(F_{CO})_{In}] \times 100$ where F is the molar flowrate.
$^c$Defined as in reference 39.
$^d$Selectivities are calculated as, $S_{CnHx} = nF_{CnHx}/F_{total\ C\ products}$ where n is the number of carbons in the alkane product and F is the total molar flowrate of C in the products.

integration of (1) oxygenated hydrocarbon conversion to synthesis gas with (2) Fischer-Tropsch synthesis in a two-bed reactor system. The reactions will yield the desired F-T products without the need to condense water and liquid by-products between the two catalyst beds. (And, as noted above, both reactions can be accomplished over a single, mixed catalyst bed.) The products of the oxygenated hydrocarbon conversion to synthesis gas reaction can be fed directly into a Fischer-Tropsch reaction without any intervening treatment steps. (A detailed description of the carbon distribution for the Fischer-Tropsch reactions is provided in the Examples.)

The activity and selectivity of Fischer-Tropsch catalysts can be affected by transport limitations within the catalyst pellets (2, 38, 39). An increase in Ru site density or pellet radius leads to increased $C_{5+}$ selectivity caused by diffusion-enhanced re-adsorption of α-olefins, which inhibits chain termination (2). However, these diffusional limitations can become so severe that they inhibit CO diffusion within the pellet, resulting in a decrease in $C_{5+}$ selectivity (2). Iglesia, et al. (2) report a structural parameter ($\chi$), dependent upon catalyst pellet radius, pore size distribution, and volumetric density of surface Ru atoms, that indicates the extent of these diffusion restrictions within a catalyst (2). For the 2.9 wt % Ru/TiO$_2$ catalyst used in these experiments, $\chi$ was $50 \times 10^{16}$ m$^{-1}$. This value is in agreement with values determined by Iglesia, et al. for TiO$_2$-supported Ru catalysts (39) and lies in the intermediate range, suggesting that transport limitations promote re-adsorption of $\alpha$-olefins but do not retard the diffusion of reactants into the catalyst pellets. Indeed, catalysts with intermediate values of $\chi$ lead to optimum $C_{5+}$ selectivity.

Figure 5:
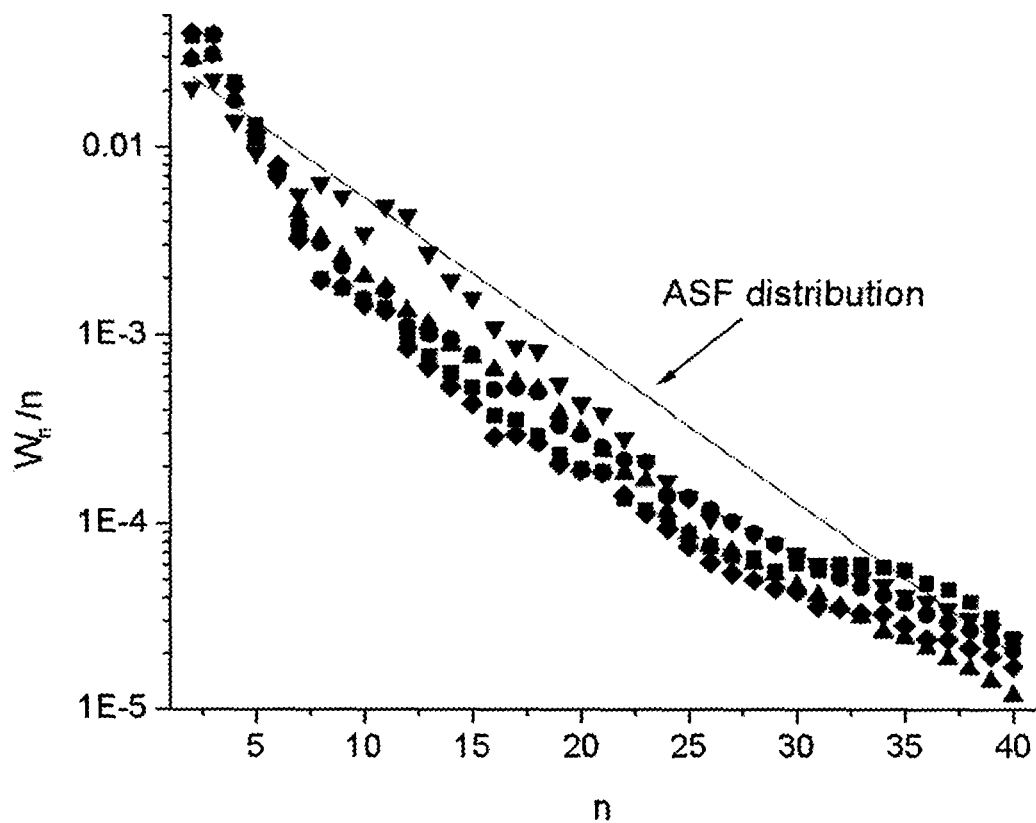
FIG. 5 is a graph depicting molecular weight distributions for dry synthesis gas (■), and water (♦), acetone (●), ethanol (▲), and acetol (▼) co-feeds. Experimental conditions were as listed in Table 2. ASF line plotted with α=0.83.

Moreover, this re-adsorption phenomenon leads to deviation from Anderson-Schulz-Flory (ASF) chain growth kinetics. As a hydrocarbon chain increases in length, diffusion through the catalyst pores becomes more difficult and the possibility for re-adsorption increases. This effect increases the chain growth probability for longer hydrocarbon chains and results in curvature in the semi-log plot of the molecular weight distribution. FIG. 5 shows such plots for the five Fischer-Tropsch runs in Table 3, and these distributions deviate from ASF kinetics, in agreement with studies by Iglesia, et al. (2, 38, 39). The olefin to paraffin ratios were relatively low, which is consistent with the long bed-residence times (6-9 s).

To demonstrate the formation of liquid fuels from the integration of glycerol conversion with Fischer-Tropsch synthesis, a two-bed catalyst system was tested using 1.0 g of 10 wt % Pt—Re (1:1)/C and 1.7-3.0 g of 1.0 wt % Ru/TiO$_2$, with an 80 wt % glycerol feed at 548 K and 5 bar total pressure. Table 4 shows the selectivities to $C_{5+}$ hydrocarbons, CO, CO$_2$, and CH$_4$, along with the carbon effluent rates in the gas, aqueous-liquid, and organic-liquid phases. Based on the production of CO from an 80 wt % glycerol feed at 548 K and 5 bar, the conversion of CO across the Ru/TiO$_2$ bed was approximately 30% for the 1.7 g run and 40% for the 3.0 g run, with site time yields of 1.3 and 1.1 min$^{-1}$, respectively. The high selectivity to CO results from the fact that all of the glycerol was converted over the Pt—Re/C catalyst, whereas 30-40% of the CO reacted over the Fischer-Tropsch catalyst. Importantly, this system produced a high selectivity to $C_{5+}$ hydrocarbons compared to CH$_4$ ($S_{C5+}$:$S_{CH4}$>1). The value of $\chi$ for the 1.0 wt % Ru/TiO$_2$ catalyst was $36 \times 10^{16}$ m$^{-1}$, in agreement with results from Iglesia et al. (39), and the hydrocarbon molecular weight distributions showed deviation from ASF kinetics (see the Examples and FIG. 7 for additional data), indicating $\alpha$-olefin re-adsorption effects. Importantly, these experiments demonstrate that liquid alkanes can be converted directly from oxygenated hydrocarbons in a two-bed reactor system using an integrated process, absent any treatment between the conversion to synthesis gas and the F-T reaction. A detailed description of the carbon distributions can be found in the Examples.

The production of synthesis gas from oxygenated hydrocarbons such as glycerol, coupled with the conversion of the synthesis gas to produce liquid fuels by Fischer-Tropsch synthesis is a net exothermic process with a heat that is about 4% of the lower heating value of glycerol (37). The data presented herein demonstrates for the first time that both of these steps can be carried out effectively at the same conditions and in a two-bed reactor system, allowing the coupling between oxygenated hydrocarbon conversion and Fischer-Tropsch synthesis to be used for the production of liquid fuels from aqueous solutions of the oxygenated hydrocarbon feedstock.

As noted earlier, glycerol can be converted to synthesis gas at high rates and selectivities at temperatures less than about 625 K according to Equation 3.

$$C_3O_3H_8 \rightarrow 3CO + 4H_2 \qquad (3)$$

This glycerol can be derived from fermentation of glucose, from hydrogenolysis of sorbitol, or as a waste product from the transesterification of plant oils and animal fats. In the present invention, this reaction is operated at low temperatures to provide the opportunity to couple the endothermic glycerol conversion reaction with an exothermic Fischer-Tropsch synthesis to produce liquid transportation fuels according to reaction 4:

$$C_3O_3H_8 \rightarrow \frac{7}{25}C_8H_{18} + \frac{19}{25}CO_2 + \frac{37}{25}H_2O \qquad (4)$$

This integrated process improves the economics of "green" Fischer-Tropsch synthesis by reducing the costs associated with synthesis gas production. Specifically, using the present invention reduces capital costs by eliminating the need for an O$_2$-blown auto-thermal reformer or a bio-mass gasifier. Also, the present invention enables reducing the size of the Fischer-Tropsch synthesis reactor by producing an undiluted synthesis gas stream and by eliminating subsequent cleaning steps required for synthesis gas produced from bio-mass gasification. Thus, the present invention allows for smaller-scale Fischer-Tropsch synthesis plants to be incorporated into a bio-refinery plant, or to process waste glycerol at a bio-diesel facility. And, as noted above, the low temperature of the conversion process allows for thermal coupling with the Fischer-Tropsch synthesis reaction, thereby increasing thermal efficiency.

Further still, the coupling between these reactions produces chemical synergies related to the presence of chemical species from both reactions in the same reactor. For example, the intermediates produced from glycerol conversion (e.g., acetol) can enter the growing hydrocarbon chain on the Fischer-Tropsch catalyst sites, and the inhibiting effect of CO

TABLE 4

Results from combined glycerol conversion with Fischer-Tropsch synthesis experiments.
Reaction carried out at 548 K and 5 bar using ~0.04 cm$^3$ min$^{-1}$ of 80 wt % glycerol feed.
Selectivities calculated as in Table 3.

| Mass Pt-Re/C (g) | Mass Ru/TiO$_2$ (g) | $S_{C5+}$ | $S_{CH4}$ | $S_{CO}$ | $S_{CO2}$ | $C_{In}$ (μmol min$^{-1}$) | $C_{Out}$ gas (μmol min$^{-1}$) | $C_{Out}$ aqueous liquid (μmol min$^{-1}$) | $C_{Out}$ organic liquid (μmol min$^{-1}$) | $C_{Out}$ total (μmol min$^{-1}$) | C balance (%) |
|---|---|---|---|---|---|---|---|---|---|---|---|
| 1.0 | 1.7 | 0.14 | 0.08 | 0.36 | 0.15 | 883 | 566 | 139 | 122 | 827 | 6 |
| 1.1 | 3.0 | 0.12 | 0.10 | 0.25 | 0.19 | 978 | 613 | 221 | 105 | 939 | 4 | partial pressure on the rate of glycerol conversion can be diminished by consuming the CO on the Fischer-Tropsch sites.

To demonstrate how the invention can be carried out in a single reactor vessel, using a single catalyst bed, glycerol conversion studies were carried out using a Pt—Re/C catalyst that was prepared by incipient wetness impregnation of carbon black (Vulcan XC-72) with an aqueous solution of $H_2PtCl_6 \ast 6H_2O$ (Sigma-Aldrich) and $HReO_4$ (Strem Chemicals) to yield a catalyst with loadings of 5.1 wt % Pt and 4.9 wt % Re (atomic Pt:Re ratio of 1:1). The support was dried in air for 12 h at 373 K prior to impregnation, and 1.7 g of solution was used per gram of support. The catalyst was dried at 403 K for 12 h in air prior to activation. A 1.0 wt % $Ru/TiO_2$ Fischer-Tropsch synthesis catalyst was prepared according to the methods described by Iglesia, et al. (40).

Prior to reaction kinetics or gas adsorption measurements (i.e., CO and $O_2$ chemisorption), the Pt—Re/C catalyst was reduced at 723 K (ramp rate of 0.5 K $min^{-1}$) for 2 h in flowing $H_2$ (140 $cm^3$(NTP) $min^{-1}$). The $Ru/TiO_2$ catalysts were reduced in-situ before reaction kinetics studies and gas adsorption measurements. The weight hourly space velocity (WHSV) was calculated for glycerol conversion experiments using the mass flow rate of glycerol into the reactor and the total mass of catalyst. The irreversible CO uptake of Pt—Re/C at 300 K was taken to be the number of catalytic sites (150 µmol $g^{-1}$) and was measured using a standard gas adsorption apparatus. This number of sites corresponds to a dispersion (molar CO:total metal ratio) of 29%. The dispersion (CO:Ru) of the $Ru/TiO_2$ catalyst was determined to be 0.55 by chemisorption of $O_2$ at 195 K in a static chemisorption system (41).

Figure 3:
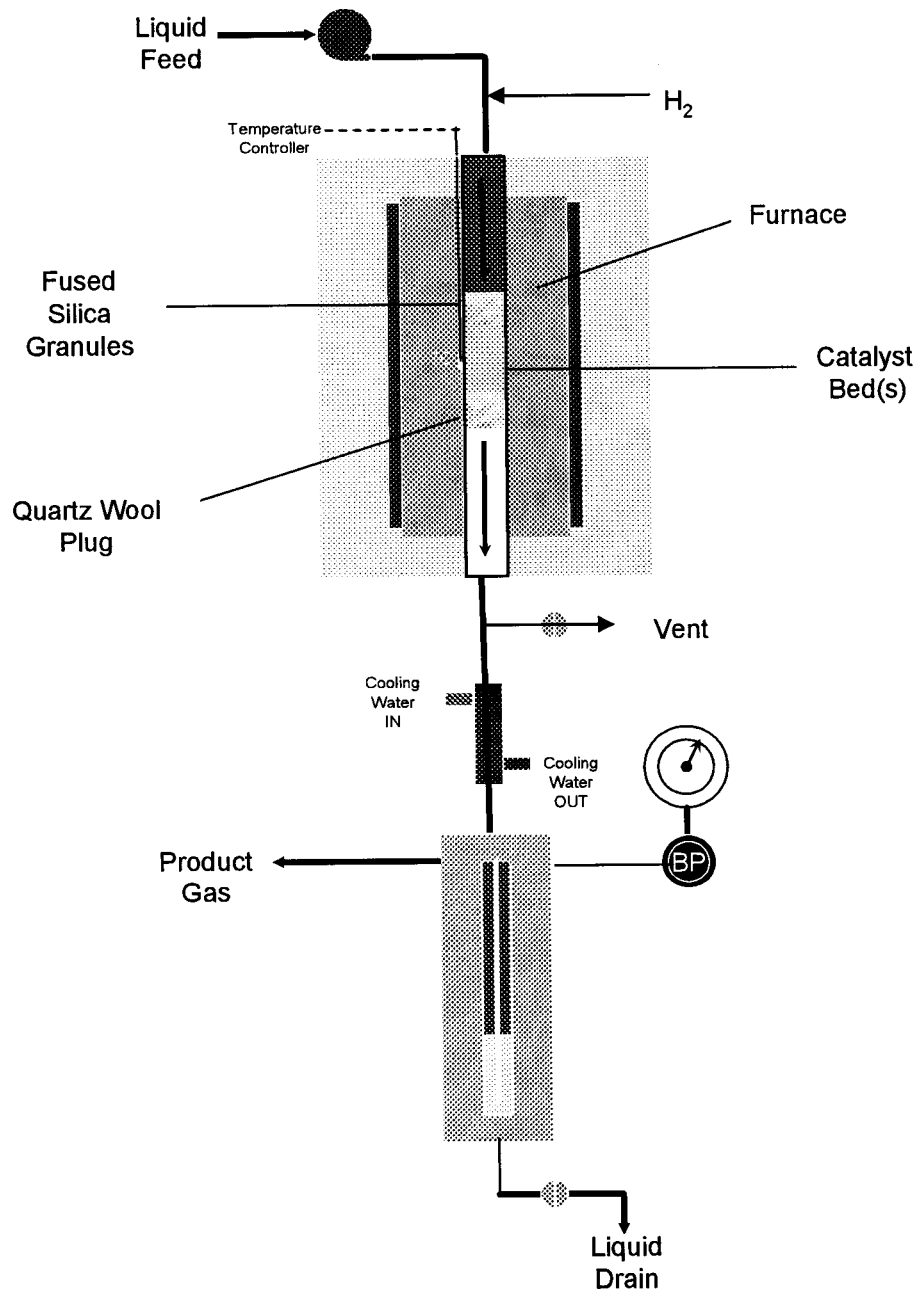
FIG. 3 is a schematic diagram of an exemplary reaction kinetics apparatus that can be used to evaluate the present invention. ($H_2$ flow is used only during catalyst reduction.)

The apparatus used to conduct combined glycerol conversion with Fischer-Tropsch synthesis experiments is shown in FIG. 3. Fresh catalyst was loaded into a 12.7 mm (0.5 inch) outer diameter tubular stainless steel reactor with a wall thickness of 0.71 mm (0.028 inch). The catalyst bed was contained between an end plug of quartz wool (Alltech) and fused $SiO_2$ granules (−4+16 mesh; Sigma-Aldrich) which aid in vaporization of the liquid feed. For experiments that combined glycerol conversion with Fischer-Tropsch synthesis in a two-bed, single-reactor system, a bed of 1.0 wt % $Ru/TiO_2$ was mixed with an equal volume of crushed $SiO_2$ granules, and this bed was loaded downstream of a 10 wt % Pt—Re(1:1)/C bed mixed with fused $SiO_2$ granules. For experiments that combined glycerol conversion with Fischer-Tropsch synthesis in a single-bed system, the catalyst bed was prepared by partially mixing the Pt—Re/C with $Ru/TiO_2$, i.e., 0.8 g of 10 wt % Pt—Re (1:1)/C was mixed with 1.7 g of 1.0 wt % $Ru/TiO_2$ and loaded beneath 0.2 g of the Pt—Re/C catalyst. The reactor was heated with a furnace consisting of a close-fitting aluminum block heated externally by a well-insulated furnace (1450 W/115 V, Applied Test Systems series 3210). Type-K thermocouples (Omega) were attached to the outside of the reactor to measure reactor temperature, which was controlled with a series 16A-type temperature controller (Dwyer Instruments). Fresh catalyst was reduced in flowing $H_2$, as described previously. Mass-flow controllers (5850 Brooks Instruments) were used to control the flow rate of $H_2$. An HPLC pump (Model 301, Alltech) was used to introduce the aqueous feed solution into a 6-inch needle with a point 5-style tip (Hamilton) soldered into a section of 3.2 mm (0.125 inch) outer diameter, stainless steel tubing, and this needle was positioned upstream of the catalyst bed. The liquid effluent was condensed in a gas-liquid separator and drained periodically for gas-chromatograph (GC) analysis (Agilent 6890 with a flame ionization detector (FID) and HP-Innowax column or Shimadzu GC-2010 with an HD detector and Rtx-5 column) and total organic carbon analysis (Shimadzu TOC-V CSH). Each effluent was tested for the presence of glycerol and other liquid byproducts. The downstream system lines from the furnace were heated at 373 K in order to prevent heavier alkanes from solidifying prior to the separator.

The effluent gas stream passed through a back-pressure regulator (GO Regulator, Model BP-60) which controlled the system pressure. The effluent gas was analyzed by gas chromatography: $H_2$ with a Carle GC (series 8700) using a thermal conductivity detector (TCD), CO and $CH_4$ using an HP 5890 GC with TCD and washed molecular sieve 5A 80/100 column (Alltech), and $CO_2$ and light alkanes ($C_2$-$C_3$) using an HP 5890 GC with TCD and a Porapak QS 100/120 column (Alltech). Gaseous alkanes ($C_1$-$C_{10}$) were measured using a Varian Saturn 3 GC/MS with a FID detector and a GS-Q capillary column (J&W Scientific). All feed solutions were prepared by mixing glycerol (99.5%, ACS reagent, Sigma-Aldrich) with deionized water.

Figures 3A, 3B, 3C:
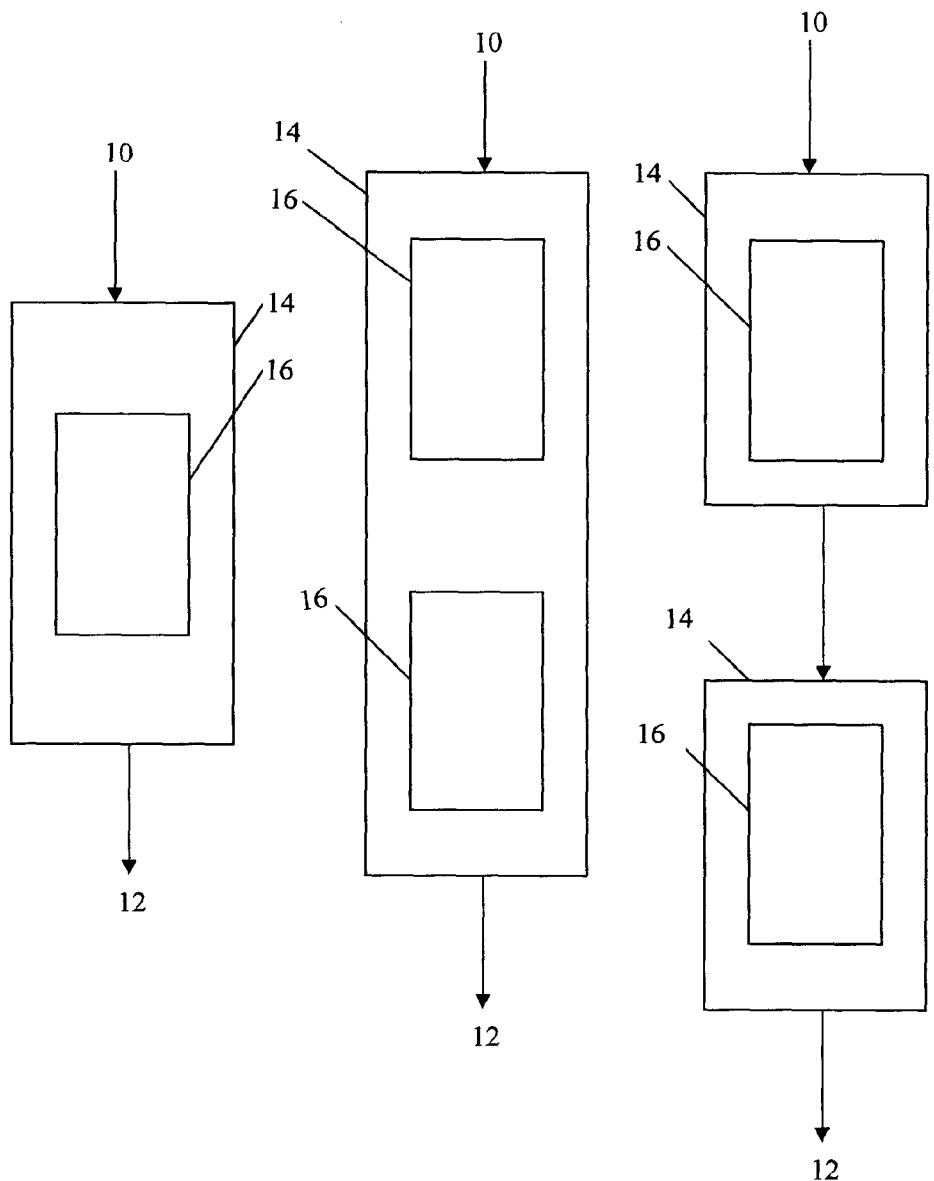
FIGS. 3A, 3B, and 3C are schematic representations of reactor and catalyst bed arrangements that can be used in the present invention.

Thus, the present invention can be carried out in a one-reactor, one-bed arrangement (as depicted in FIG. 3A) or a one-reactor, multi-bed arrangement (as depicted in FIG. 3B), or in a two-reactor arrangement (as depicted in FIG. 3C). In each of FIGS. 3A, 3B, and 3C, the reactor 14 has an inlet 10 for introducing reactants and an outlet 12 for withdrawing products. Within each reactor are one or more catalyst beds 16. These experiments employed either a two-bed catalyst system using 1.0 g of 10 wt % Pt—Re (1:1)/C followed by 1.7 g of 1.0 wt % $Ru/TiO_2$, or a single catalyst bed consisting of a partial physical mixture of the two catalysts (as described previously), with an 80 wt % glycerol feed at 548 K and total pressures between 5 and 17 bar. Table 5A shows the selectivities to $C_{5+}$, $CH_4$, and $C_2$-$C_4$ alkanes for each of the combined experiments based solely on the alkane products (i.e., $C_1$-$C_{5+}$). The selectivity for production of $C_{5+}$ alkanes by Fischer-Tropsch synthesis typically increases at higher pressures, and the results for the two-bed reactor system follow this trend. An increase in pressure from 5 bar to 11 bar results in an increase in the selectivity to $C_{5+}$ hydrocarbons from 0.46 to 0.59; however, a further increase in pressure to 17 bar only produces a slight decrease in $S_{C5+}$ to 0.57. Importantly, the selectivity to $C_{5+}$ hydrocarbons is almost three times the selectivity to $CH_4$ at 11 bar and 17 bar as compared to 5 bar. Table 5B shows the total carbon selectivities based on the total amount of carbon in all of the products.

At 5 bar, the primary product was CO from glycerol conversion with only 32% of the carbon going to alkanes. However, increasing the pressure to 11 bar and 17 bar shifts the carbon distribution toward $C_1$-$C_{5+}$ alkanes (i.e., $S_{Alkanes}$ increases to 42% and 51% at 11 bar and 17 bar, respectively). Also, the amount of carbon as oxygenates in the organic liquid effluent ($C_3$-$C_7$ ketones) increases by more than a factor of 5 with increasing pressure. The percentage of carbon in the organic liquid products ($C_{5+}$ and organic oxygenates) was 43% at 17 bar, 35% at 11 bar, and 15% at 5 bar with the percentage of carbon in gaseous products (CO, $CO_2$, and $C_1$-$C_{10}$ alkanes) decreasing from 71% at 5 bar to approximately 50% at 11 and 17 bar. At 5 bar and 11 bar, 14% of the carbon is contained as oxygenated species in the aqueous effluent and at 17 bar, this value slightly decreases to 10%. These aqueous liquid effluents contain between 5 wt % and 15 wt % methanol, ethanol, and acetone and are suitable for further distillation.

At 17 bar, the amount of carbon leaving the reactor as CO decreases by more than an order of magnitude, and the selectivity to alkanes increases compared to running the reactions at 11 bar. However, the selectivity to $C_{5+}$ alkanes slightly decreases. This behavior results from both increased water-gas shift activity (indicated by higher $S_{CO2}$), as well as an increase in the rate of Fischer-Tropsch synthesis at higher pressures. The higher Fischer-Tropsch synthesis rate causes the temperature of the Ru/TiO$_2$ bed to increase resulting in the formation of lighter alkanes (i.e., $C_1$-$C_4$). Therefore, the carbon distribution is shifted toward lighter alkane products (i.e., increase in $S_{Alkanes}$ without a corresponding increase in $S_{C5+}$).

Table 6 shows the percentage of carbon contained in each product phase for the combined glycerol conversion with Fischer-Tropsch synthesis experiments in Tables 5A and 5B. It is clear that the percentage of the effluent carbon contained in the liquid organic stream increases progressively from 15% to 42.7% as the pressure for the two-bed catalyst system increases from 5 to 17 bar. Importantly, the percentage of the effluent carbon in the liquid organic stream increases to 50.7% when the PtRe/C and the Ru/TiO$_2$ catalysts are partially mixed at 17 bar. These are critically important results because the results for the mixed bed reactions show that the present invention can be used to produce liquid fuels from biomass at very high carbon yields.

As noted earlier, the conversion of glycerol to synthesis gas is inhibited by CO. Conversely, the production of alkanes by CO hydrogenation over Ru is positive order with respect to CO at high CO partial pressures (i.e., >1.5 bar). Furthermore, as stated previously, the heat produced by the Fischer-Tropsch synthesis can be consumed by the glycerol conversion reaction. Therefore, when the active sites of catalysis for the two reactions are brought into close proximity, then the Ru catalyst increases the activity of the Pt—Re catalyst at high pressures by consuming the CO that is produced over Pt—Re from glycerol. Additionally, the glycerol gasification reaction consumes the heat produced by CO hydrogenation in the Fischer-Tropsch reaction, thereby keeping the temperature in the catalyst bed at conditions favorable for long chain growth (i.e., lower temperature in the catalyst bed).

TABLES 5A and 5B

Results from combined glycerol conversion with Fischer-Tropsch synthesis experiments. A.) Selectivities to $C_{5+}$, $CH_4$, and $C_2$-$C_4$ in alkane products. Selectivities calculated as, $S_{CnHx} = nF_{CnHx}/F_{total}$, where n is the number of carbons in the alkane product $C_nH_x$, $F_{CnHx}$ is the molar flow rate of product $C_nH_x$, and $F_{total}$ is the total molar flow rate of carbon in alkane products. B.) Total carbon selectivities. Selectivities calculated as $S_i = F_i/F_{total} \times 100$, where $F_i$ is the total flow rate of carbon in product i and $F_{total}$ is the total flow rate of carbon in all of the products. Reactions carried out at 548 K using ~0.04 cm$^3$ min$^{-1}$ of 80 wt % glycerol feed (WHSV of glycerol ≈0.86 h$^{-1}$).

5A

| $P_{tot}$ (bar) | $S_{C5+}$ | $S_{CH4}$ | $S_{C2-C4}$ |
|---|---|---|---|
| 5 | 0.46 | 0.28 | 0.26 |
| 11 | 0.59 | 0.22 | 0.19 |
| 17 | 0.57 | 0.20 | 0.23 |
| 17[a] | 0.64 | 0.15 | 0.21 |

TABLES 5A and 5B-continued

Results from combined glycerol conversion with Fischer-Tropsch synthesis experiments. A.) Selectivities to $C_{5+}$, $CH_4$, and $C_2$-$C_4$ in alkane products. Selectivities calculated as, $S_{CnHx} = nF_{CnHx}/F_{total}$, where n is the number of carbons in the alkane product $C_nH_x$, $F_{CnHx}$ is the molar flow rate of product $C_nH_x$, and $F_{total}$ is the total molar flow rate of carbon in alkane products. B.) Total carbon selectivities. Selectivities calculated as $S_i = F_i/F_{total} \times 100$, where $F_i$ is the total flow rate of carbon in product i and $F_{total}$ is the total flow rate of carbon in all of the products. Reactions carried out at 548 K using ~0.04 cm$^3$ min$^{-1}$ of 80 wt % glycerol feed (WHSV of glycerol ≈0.86 h$^{-1}$).

5B

| $P_{tot}$ (bar) | $S_{Alkanes}$ (%) | $S_{CO2}$ (%) | $S_{CO}$ (%) | $S_{org-oxy}$[b] (%) | $S_{aqu-oxy}$[c] (%) |
|---|---|---|---|---|---|
| 5 | 31.6 | 15.1 | 37.0 | 2.5 | 13.8 |
| 11 | 41.6 | 15.5 | 16.4 | 12.7 | 13.8 |
| 17 | 51.2 | 21.5 | 1.2 | 15.7 | 10.4 |
| 17[a] | 55.3 | 19.7 | 0.7 | 17.5 | 6.7 |

[a]Partially mixed bed.
[b]Oxygenated species in the organic phase.
[c]Oxygenated species in the aqueous phase.

TABLE 6

Percentage of carbon contained in each product phase for the combined glycerol conversion with Fischer-Tropsch synthesis experiments in Tables 5A and 5B.

| $P_{tot}$ (bar) | Gaseous[a] | Organic Liquid[b] | Aqueous Liquid[c] |
|---|---|---|---|
| 5 | 71.0 | 15.3 | 13.8 |
| 11 | 51.2 | 35.0 | 13.8 |
| 17 | 46.9 | 42.7 | 10.4 |
| 17[d] | 42.5 | 50.7 | 6.7 |

[a]CO, CO$_2$, and $C_1$-$C_9$ alkanes.
[b]$C_3$-$C_7$ ketones.
[c]Methanol, ethanol, acetone, and n-propanol.
[d]Partially mixed bed.

The data in Table 5A, 5B, and 6, show that the mixed bed configuration (using a homogeneous catalyst or a mixed catalyst) is superior in liquid alkane yield to the configuration comprised of segregated beds (although both configurations are encompassed by the present claims). Mixing the beds increases the selectivity to alkanes by more than 10% while consuming most of the CO produced from glycerol. High conversion of CO resulted in a decrease in $C_{5+}$ selectivity for the segregated bed system; however, the experiment using the mixed bed produced alkane products with a higher $S_{C5+}$ (0.64) compared to the combined experiments. Also, the amount of carbon in the organic liquid products increases from 35% for the two-bed system at 11 bar to 50% for the mixed bed at 17 bar. The amount of carbon in the gaseous products decreases from 50% to 43%, while the amount of carbon in the aqueous phase decreases by a factor of 2 (14% to 7%).

The $C_{5+}$ selectivity, selectivity to $C_3$-$C_7$ ketones in the organic liquid, and the conversion of CO for combined glycerol conversion with Fischer-Tropsch synthesis at 11 bar and 17 bar are all higher than those at 5 bar, despite the fact that the activity of the Pt—Re/C catalyst is decreased at these elevated pressures. These results indicate that the more favorable Fischer-Tropsch conditions (i.e., higher pressure) are more essential to the integrated process than the synthesis gas production rate. Furthermore, the Ru/TiO$_2$ catalyst is exposed to increasing amounts of oxygenated hydrocarbon by-products at 11 bar and 17 bar. However, the selectivity to oxygenates in the aqueous liquid effluent at these pressures is similar to, or less than, that of the aqueous effluent at 5 bar. This result indicates that the oxygenated hydrocarbon by-products from glycerol react over the Ru/TiO$_2$ bed, most likely by entering into Fischer-Tropsch chain growth. Because the aqueous product distribution contains a wide array of oxygenated species, it is likely that other by-products (e.g., polyols, secondary alcohols, and hydroxyl-ketones) have a similar synergistic effect on Fischer-Tropsch synthesis. Importantly, these experiments demonstrate that liquid alkanes can be produced directly from glycerol using an integrated process.

Glycerol conversion and Fischer-Tropsch synthesis can be carried out effectively (and perhaps synergistically) at the same conditions either in a two-bed reactor system consisting of separate glycerol conversion and Fischer-Tropsch synthesis catalysts or in a single, mixed bed system, allowing the coupling between glycerol conversion and Fischer-Tropsch synthesis to be used for the production of liquid fuels from aqueous-glycerol solutions. Both approaches are encompassed by the present invention. This "green" process represents an energy efficient alternative to producing liquid transportation fuels from petroleum. Furthermore, it presents the opportunity for improving the economic viability of "green" Fischer-Tropsch synthesis via reducing costs associated with synthesis gas production and by improving the thermal efficiency of Fischer-Tropsch processes.

In particular, the low temperature of our glycerol conversion process allows for thermal coupling with the Fischer-Tropsch synthesis reaction, thereby increasing thermal efficiency. Furthermore, the coupling between these processes produces chemical synergies related to the presence in the same reactor of chemical species from both reactions, e.g., the intermediates produced from glycerol conversion can enter the growing hydrocarbon chain on the Fischer-Tropsch catalyst sites, and the inhibiting effect of CO partial pressure on the rate of glycerol conversion can be diminished by consuming the CO on the Fischer-Tropsch sites.

Note that the preferred catalysts for use in the invention are noted above and in the Examples. The catalysts that can be used in the present invention comprise primary metals selected from the group consisting of Ru, Co, Fe (FeC, Fe$_2$O$_3$, Fe$_3$O$_4$), Ni, Rh, Pt, Pd, Ir, and combinations thereof. Also included as catalysts that can be used in the invention are oxides of any of the listed metals, any bimetallic combination of the above metals or their oxides, as well as unsupported powders of the above metals.

Where the catalysts are on a support, carbon is generally preferred. Other catalyst supports can also be used in the present invention, such as zeolites, polymeric supports, etc. Catalyst supports that can be used in the present invention include, without limitation, TiO$_2$ (preferably 25%-100% anatase), SiO$_2$, Al$_2$O$_3$, MgO, ZrO$_2$, Zr$_x$Ti$_y$O$_2$, ThO$_2$, Kieselguhr, La$_2$O$_3$, MgCr$_2$O$_4$, Ti$_x$Si$_y$O$_2$, Ti$_x$Zr$_y$O$_2$, ZnO, Cr$_2$O$_3$, MnO, Nb$_2$O$_5$, CeO$_2$, Y-zeolite, USY-zeolite, ZSM-5 zeolite, MCM-41 zeolite, MCM-22 zeolite, HZSM-5 zeolite, H-BEA zeolite, HY-zeolite, Fe-substituted LTL zeolite, ITQ-6, delaminated zeolite, ITQ-2 delaminated zeolite, HMS molecular sieves, montmorillonite, macroporous styrene-divinylbenzene, 4-vinylpridine-divinylbenzene, anthracene, carbonized-quinoline, and combinations therefore (including mixed oxides, aerogels, and mesoporous forms of the above-noted oxides).

Promoters that can be used in the present invention include, without limitation (with preferred promoters of each specific element in parenthesis), Cu (CuO), K (K$_2$CO$_3$, K$_2$O), Mn (MnO), La (La$_2$O$_3$), Ru, Re, Zn (ZnO), Si, Ag, Pt, Ce (CeO$_2$), Gd$_2$O$_3$, ThO$_2$, MnO, ZrO$_2$, Pd, Ti, Co, Cr, V, Li, Na, Rb, Cs, Mo, Au, B, Cl, and combinations thereof.

The reactions can be carried out over a rather large range of conditions. However, the critical process conditions generally fall within the following ranges:

Temperature: ≦about 750 K, with about 473 K to 625 K most preferred.

Total pressure range: 1-30 bar.

H$_2$/CO syngas ratio: 1-10.

Syngas co-feeds include (without limitation): water, olefins, alcohols, other oxygenated hydrocarbon molecules, and paraffins.

EXAMPLES

The following Examples are included solely to provide a more complete disclosure of the invention described and claimed herein. The Examples are non-limiting.

Example 1

Catalyst Preparation and Characterization

Supported Pt catalysts were prepared by incipient wetness impregnation of Al$_2$O$_3$ (Catapal B-brand, from Sasol, Johannesburg, South Africa and Houston, Tex.), CeO$_2$/ZrO$_2$, MgO/ZrO$_2$, and ZrO$_2$ using chloroplatinic acid hexahydrate (Strem Chemicals, Newburyport, Mass.) for ZrO$_2$ and CeO$_2$/ZrO$_2$, and using tetraamine platinum (II) nitrate (Strem Chemicals) for Al$_2$O$_3$ and MgO/ZrO$_2$. Following impregnation, the Pt/ZrO$_2$ and Pt/CeO$_2$/ZrO$_2$ catalysts were dried in air at 393 K for 15 h and calcined at 773 K for 4 h in a muffle furnace. During calcination, the temperature was increased from room temperature to 373 K and held for 1 hour, then increased by increments of 100 K to 773 K, holding at each increment for 1 hour. The MgO/ZrO$_2$- and Al$_2$O$_3$-supported Pt catalysts were dried in air for 15 hours at 393 K and then calcined in flowing O$_2$/He gas mixtures (20% for Pt/MgO/ZrO$_2$ and 10% for Pt/Al$_2$O$_3$, using a flow rate of 300 cm$^3$ (NTP) per minute) to 533 K (at 1.3 K per minute) for Pt/Al$_2$O$_3$ and 723 K (at 3.6 K per minute) for Pt/MgO/ZrO$_2$ and held at these temperatures for 2 hours. The carbon-supported Pt catalyst and Pt:Ru (atomic ratio of 1:1) alloy catalyst were purchased from E-TEK (a division of PEMEAS Fuel Cell Technologies, Somerset, N.J.). The carbon-supported Pt:Re catalyst (atomic ratio of 1:1) was prepared via incipient wetness impregnation of Pt/C (ETEK) using perrhenic acid (Strem Chemicals, Newburyport, Mass.). Prior to reaction kinetics or gas adsorption measurements (i.e., CO chemisorption, Brunauer-Emmett-Teller ["BET"] surface area), each catalyst was reduced in flowing H$_2$ (180 cm$^3$ (NTP) per minute) at temperatures of 533 K (Al$_2$O$_3$, MgO/ZrO$_2$, and carbon-supported catalysts; ramped at 0.5 K per minute and held for 2 hours) or 773 K (CeO$_2$/ZrO$_2$— and ZrO$_2$-supported catalysts; ramped at 0.5 K per minute and held for 1 hour). The Pt:Ru/C catalyst was reduced in flowing H$_2$ (140 cm$^3$ (NTP) per minute) at the reaction temperature (548 K or 573 K; ramped at 0.5 K per minute), while Pt:Re/C was reduced at 723 K (ramp rate of 0.5 K per minute) for 2 hour in flowing H$_2$ (140 cm$^3$ (NTP) per minute). Table 7 shows the characteristics of each catalyst. The irreversible CO uptakes and BET surface areas were measured on a standard gas adsorption apparatus described elsewhere (28).

The preparation of ZrO$_2$ and CeZrO$_2$ supports is described in detail elsewhere (29). Briefly, these oxide supports were prepared by co-precipitation, starting from an aqueous solution containing 0.12 M of both zirconyl nitrate (Sigma-Aldrich, Milwaukee, Wis.) and cerium ammonium nitrate (Sigma-Aldrich) and using an excess (Me$^{4+}$:OH$^-$=8) of ammonium hydroxide (28-30 wt % $NH_3$, Sigma-Aldrich) as the precipitation agent. The precipitates were washed in deionized (DI) water and calcined at 773 K in air in a muffle furnace. A similar procedure for preparation of $MgO/ZrO_2$ is described elsewhere (30). The $MgO/ZrO_2$ support was prepared using an aqueous solution containing 0.2 M of magnesium nitrate (Sigma-Aldrich) and 0.02 M of zirconyl nitrate (Sigma-Aldrich). The solution was stirred at room temperature while NaOH solution (25 wt %) was added until a pH of 10 was reached and the corresponding gel was formed. The gel was aged for 72 hours and vacuum filtered. The precipitate formed was washed with DI water until the Na concentration in the filtrate was below 10 ppm as measured by inductively-coupled plasma (ICP) analysis. The sample was then dried in air at 393 K for 16-24 h. The $MgO/ZrO_2$ support was calcined in flowing $O_2$ (100 $cm^3$ (NTP) per minute) to 873 K (3.2 K per minute) and then held at this temperature for 3 hours. Table 7 presents the properties of the various supported metal catalysts:

TABLE 7

Properties of supported metal catalysts.

| Catalyst | Wt % Pt[a] | Irreversible CO Uptake ($\mu mol\ g^{-1}$) | BET Surface Area ($m^2\ g^{-1}$) | CO/Metal Atomic Ratio |
|---|---|---|---|---|
| $Pt/Al_2O_3$ | 3.0 | 92 | 218 | 0.60 |
| $Pt/MgO/ZrO_2$ | 1.5 | 22 | 182 | 0.29 |
| $Pt/ZrO_2$ | 1.0 | 26 | 112 | 0.51 |
| $Pt/CeO_2/ZrO_2$ | 1.0 | 5.5 | 73.7 | 0.11 |
| Pt/C-Vulcan XC-72 | 5.0 | 110 | — | 0.42 |
| Pt:Ru/C-Vulcan XC-72 | 5.0 | 120 | — | 0.23 |
| Pt:Re/C-Vulcan XC-72 | 5.0 | 110 | — | 0.20 |

[a]Nominal loading

Example 2

Reaction Kinetics Measurements

FIG. 3 shows a schematic of the apparatus used to conduct reaction kinetics measurements. A shown in the figure, the apparatus comprises a tubular reactor disposed within a furnace. Fused silica granules and quartz wool are used to hold one or more catalyst beds within the reactor. The effluent from the tubular reactor is passed through a cooling column, and the product gases are separated from the product liquids. Both the product gases and liquids are then removed from the apparatus shown in FIG. 3 for further analysis. More specifically, fresh catalyst was loaded into a 0.25-inch outer diameter tubular stainless steel reactor. For experiments at low temperature conditions (i.e., 548 and 573 K over Pt:Ru/C and Pt:Re/C), a 0.5-inch outer diameter tubular stainless steel reactor was used. For both tubular reactor types, the catalyst bed was contained between an end plug of quartz wool (Alltech, Nicholasville, Ky.) and fused $SiO_2$ granules (−4+16 mesh; Sigma-Aldrich) which aid in vaporization of the liquid feed. The Pt/C, Pt:Ru/C, and Pt:Re/C catalyst powders were mixed with equal volumes of crushed $SiO_2$ granules before loading in the reactor to reduce the pressure drop across the catalyst bed. Type-K thermocouples (Omega Engineering, Stamford, Conn.) were attached to the outside of the reactor to measure reactor temperature, which was controlled with a series 16A type temperature controller (Dwyer Instruments, Michigan City, Ind.). The fresh catalyst was reduced in flowing $H_2$ as outlined above. Mass-flow meters (Model 5850, Brooks Instrument, a division of Emerson Process Management, Hatfield, Pa.) were used to control the flow rate of $H_2$. An HPLC pump (Model 301, Alltech) was used to introduce the aqueous feed solution into the liquid injection unit above the reactor. The unit is comprised of a 6-inch needle with a point 5 style tip (Hamilton Company, Reno, Nev.) soldered into a section of 0.125-inch stainless steel tubing. The needle extends into the reactor just above the fused $SiO_2$ granules. The effluent from the reactor was water-cooled in a double-pipe heat exchanger. The effluent liquid was drained periodically for GC analysis (Agilent Model 6890 with an flame ionization detector ("FID") and HP-Innowax column or Shimadzu GC-20 10 with an FID detector and DB 5 column) and total organic carbon analysis (Shimadzu TOC-V CSH). Each effluent was tested for the presence of glycerol and other liquid byproducts.

The effluent gas stream passed through a back-pressure regulator (GO Regulator, [Spartanburg, S.C.], Model BP-60) which controlled the system pressure. The effluent gas was analyzed with three different gas chromatographs: (1) $H_2$ was analyzed with a Carle GC (series 8700) using a thermal conductivity detector ("TCD"); (2) CO. $CH_4$, and $C_2$-hydrocarbons were analyzed using an HP-5890 GC with a TCD and washed molecular sieve 5A 80/100 column (Alltech); and (3) $CO_2$ was analyzed using a Shimadzu GC-8A with TCD and a Haysep DB 100/120 column (Alltech).

All feed solutions were prepared by mixing glycerol (99.5%, ACS reagent grade, Sigma-Aldrich) with DI water.

Example 3

Variation of $H_2$:CO Ratio Using a Two-Bed Catalytic System

Figures 4A, 4B:
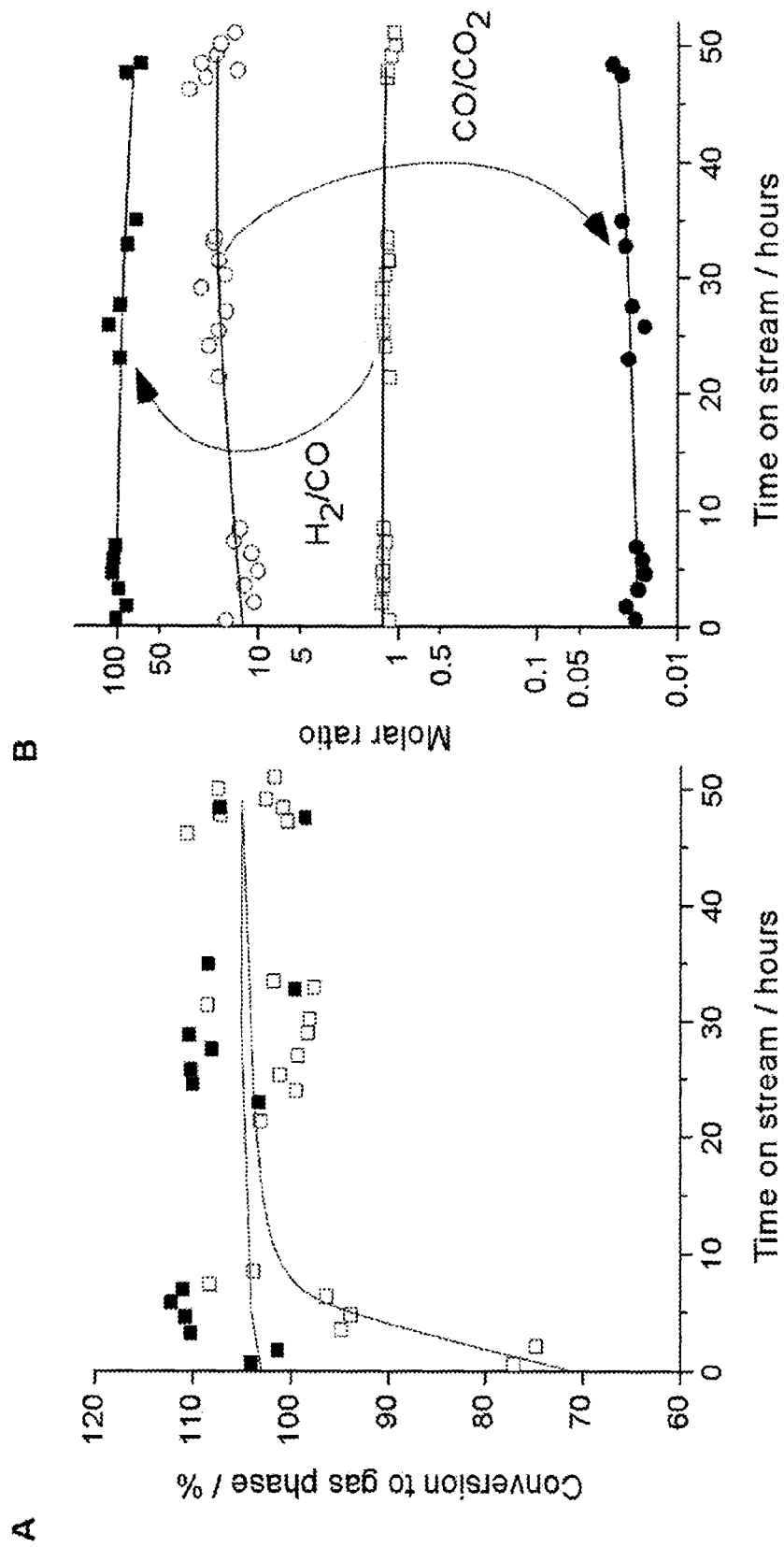
FIGS. 4A and 4B are graphs depicting variation of glycerol conversion to gas phase products (FIG. 4A) and molar ratios for gas phase reforming of 0.16 cm³ min⁻¹ of 30 wt % glycerol (FIG. 4B) at 1 bar and 623 K for a single bed system (0.090 g Pt/C: open symbols) and a double bed system (0.090 g Pt/C, 1.0 g Pt/CeO2/$ZrO_2$: closed symbols).

A catalytic system to produce synthesis gas with varying $H_2$:CO ratios was fashioned using two catalyst beds, the first of which was a Pt/C bed to achieve 100% conversion of glycerol to produce a $H_2$/CO gas mixture, followed by a second catalyst that was effective for water-gas shift, such as 1.0% $Pt/CeO_2/ZrO_2$ containing redox sites to promote water-gas shift (31, 32). As shown in FIGS. 4A and 4B, this two-bed catalyst system achieved 100% conversion of glycerol, and the $H_2$:CO and CO:$CO_2$ ratios remained stable for at least 48 hours time-on-stream. The values of 1.33 and 14 for the $H_2$:CO and CO:$CO_2$ ratios, respectively, for the Pt/C catalyst indicate a negligible contribution from the water-gas shift reaction; however, the significant increase in the $H_2$:CO ratio and the corresponding decrease in the CO:$CO_2$ ratio for the two-bed catalyst system indicate that the $Pt/CeO_2/ZrO_2$ catalyst has achieved effective water-gas shift conversion.

Example 4

Combined Gasification and Fischer-Tropsch in a Single Reactor

A carbon supported platinum rhenium catalyst was prepared to contain 5 wt % platinum and an atomic ratio of Pt/Re of 1:2.5. This catalyst was prepared via the incipient wetting of an aqueous solution of dihydrogenhexachloroplatinate (IV) hexahydrate (39.85% Pt) (Alfa Aesar, a wholly-owned subsidiary of Johnson Matthey Company, Ward Hill, Mass.) and perrhenic acid on a hydrogen peroxide functionalized UU 60×120 mesh carbon and dried at 100° C. under vacuum.

An amount (9.64 grams) of this catalyst was loaded in a ½ inch stainless steel reactor and reduced in flowing hydrogen before reaction. The stainless steel reactor was heated using an aluminum block heater to maintain isothermal conditions.

A 70 wt % glycerol-in-water solution was fed over the catalyst at 260° C. and 600 psig at a WHSV of 2.4 based on the glycerol (2.4 grams of glycerol per gram of catalyst per hour). At these reaction conditions the feed remained in the condensed form over the catalyst bed.

Under the stated reaction conditions, 100% of the glycerol was converted. Ninety-three percent (93%) of the carbon was collected in gas-phase products. One percent (1%) of the carbon was collected as an organic layer that was analyzed via GCMS. Analysis of this organic layer showed the presence of $C_9$ through $C_{20}$ hydrocarbons. See Table 7.

While the yields are low, this Example clearly demonstrates that the reaction yields long-chain hydrocarbons. The presence of these long chain hydrocarbons indicates that a Fischer-Tropsch reaction is occurring within the single reactor system.

TABLE 8

Yield of Long-Chain Hydrocarbons.

| Compound | Wt % of Carbon in Organic Phase |
| --- | --- |
| NONANE | 1.1506 |
| DECANE | 0.6107 |
| UNDECANE | 0.5268 |
| DODECANE | 0.3329 |
| PENTADECANE | 0.2194 |
| HEXADECANE | 0.1499 |
| HEPTADECANE | 0.5248 |
| OCTADECANE | 0.1241 |
| EICOSANE | 0.0555 |

Example 5

Catalyst Preparation and Characterization

The Pt—Re/C catalyst was prepared by incipient wetness impregnation of carbon black (Vulcan XC-72) with an aqueous solution of $H_2PtCl_6*6H_2O$ (Sigma-Aldrich) and $HReO_4$ (Strem Chemicals) to yield a catalyst with nominal loadings of 5.1 wt % Pt and 4.9 wt % Re (atomic ratio of 1:1). The support was dried in air for 12 h at 373 K prior to impregnation, and 1.7 g of solution was used for every gram of support. The catalyst was dried at 403 K for 12 h in air, prior to activation. The $Ru/TiO_2$ catalysts (1.0 wt % and 2.9 wt %) were prepared according to the method used by Iglesia, et al. (40).

Prior to reaction kinetics or gas adsorption measurements (i.e., CO and $O_2$ chemisorption), the Pt—Re/C catalyst was reduced at 723 K (ramp rate of 0.5 K min$^{-1}$) for 2 h in flowing $H_2$ (140 cm$^3$(NTP) min$^{-1}$). The $Ru/TiO_2$ catalysts were reduced in-situ before reaction kinetics studies and gas adsorption measurements. The irreversible CO uptake of Pt—Re/C at 300 K was taken to be the number of catalytic sites (150 μmol g$^{-1}$) and was measured using a standard gas adsorption apparatus described in the literature (28). The dispersions of the $Ru/TiO_2$ catalysts were determined by chemisorption of $O_2$ at 195 K in a static chemisorption system (41), and $\chi$ values of $36 \times 10^{16}$ m$^{-1}$ and $50 \times 10^{16}$ m$^{-1}$ for 1.0 wt % $Ru/TiO_2$ and 2.9 wt % $Ru/TiO_2$, respectively, were calculated. Table 9 shows the properties of the $Ru/TiO_2$ catalysts, and these results are in agreement with similar catalysts studied by Iglesia, et al. (39).

Example 6

Reaction Kinetics Measurements

The apparatus used to conduct reaction kinetics measurements for Pt—Re/C is described elsewhere (37). Fresh catalyst was loaded into a ½-inch outer diameter tubular stainless steel reactor. The catalyst bed was contained between an end plug of quartz wool (Alltech) and fused $SiO_2$ granules (−4+16 mesh; Sigma-Aldrich) which aid in vaporization of the liquid feed. The Pt—Re/C catalyst powder was mixed with equal volumes of crushed $SiO_2$ granules to decrease the pressure drop across the catalyst bed. For combined glycerol conversion with Fischer-Tropsch synthesis experiments, a bed of 1.0 wt % $Ru/TiO_2$ was loaded downstream of the Pt—Re/C bed. Type-K thermocouples (Omega) were attached to the outside of the reactor to measure reactor temperature, which was controlled with a series 16A type temperature controller (Dwyer Instruments). Fresh catalyst was reduced in flowing $H_2$, as described in the previous section. Mass-flow controllers (5850 Brooks Instruments) were used to control the flow rate of $H_2$. An HPLC pump (Model 301, Alltech) was used to introduce the aqueous feed solution into a 6-inch needle with a point 5 style tip (Hamilton) soldered into a section of ⅛-inch stainless steel tubing. This needle introduces liquid feed solutions into the reactor. The liquid effluent from the reactor was water-cooled in a double-pipe heat exchanger and was drained periodically for gas chromatography (GC) analysis (Agilent 6890 with a flame ionization detector (FID) and HP-Innowax column or Shimadzu GC-2010 with an FID detector and Rtx-5 column) and total organic carbon analysis (Shimadzu TOC-V CSH). Each effluent was tested for the presence of glycerol and other liquid byproducts.

The effluent gas stream passed through a back-pressure regulator (GO Regulator, Model BP-60) which controlled the system pressure. The effluent gas was analyzed with gas chromatography: $H_2$ with a Carle GC (series 8700) using a thermal conductivity detector (TCD), CO and $CH_4$ using an HP 5890 GC with TCD and washed molecular sieve 5A 80/100 column (Alltech), and $CO_2$ and light alkanes ($C_2$-$C_3$) using an HP 5890 GC with TCD and a Porapak QS 100/120 column (Alltech). All feed solutions were prepared by mixing glycerol (99.5%, ACS reagent, Sigma-Aldrich) with deionized water. The apparatus used to conduct Fischer-Tropsch synthesis experiments is similar to that used for reaction kinetics measurements of Pt—Re/C, except the outlet lines from the reactor were heated at 373 K. The 2.9 wt % $Ru/TiO_2$ catalyst was mixed with an equal volume of crushed $SiO_2$ granules to help dissipate the heat generated by the exothermic Fischer-Tropsch reaction and loaded into a ½-inch outer diameter, stainless steel tubular reactor. The liquid phase products were collected in a gas-liquid separator and analyzed by GC (Shimadzu GC-2010 with an FID detector and Rtx-5 column). The effluent gas stream was analyzed for $C_1$-$C_{10}$ hydrocarbons with a Varian GC-MS (Saturn 3) using an FID detector and GS-Q capillary column. CO and $CO_2$ were analyzed with an HP 5890 GC with TCD and a Porapak QS 100/120 column (Alltech). Ultra-high purity CO and $H_2$ (Linde) were used, and aqueous solutions of acetone, acetol, and ethanol were introduced into the reactor in a similar way as the above glycerol solutions.

Example 7

Carbon Distributions (a) Conversion of Glycerol over Pt—Re/C:

FIG. 6 shows the conversion to gas-phase products and the $CO/CO_2$ and $H_2/CO$ molar ratios, and Table 10 shows the outlet carbon distribution for conversion of a 30 wt % glycerol solution over 520 mg of 10 wt % Pt—Re/C (atomic ratio 1:1). The total inlet flow rate of carbon (as glycerol) for this experiment was 833 µmol min$^{-1}$ (feed flow rate of 0.08 cm$^3$ min$^{-1}$), and the total conversion of glycerol was 91% (58% to gas phase products and 33% to liquid phase products).

Tables 11-13 show the outlet carbon distributions and carbon balances for conversion of 50 and 80 wt % glycerol solutions over 1.0 g of 10 wt % Pt—Re/C (atomic ratio 1:1) at 548 K and total pressures between 1-11 bar. The inlet liquid flow rate was 0.04 cm$^3$ min$^{-1}$ for the 50 wt % solution and 0.03 cm$^3$ min$^{-1}$ for the 80 wt % solution. The total conversion of glycerol was 100% for each condition.

(b) Fischer-Tropsch Synthesis Over Ru/TiO$_2$

Tables 14 and 15 show the carbon distributions and carbon balances for Fischer-Tropsch synthesis of 150 cm$^3$ min$^{-1}$ of an $H_2$/CO mixture with $H_2$:CO=2 along with co-feeds of water and aqueous solutions of oxygenated molecules at 548 K over 4 g of 2.9 wt % Ru/TiO$_2$. Conversion of acetol co-feed to products was 100%, whereas less than 20% of ethanol formed products and less than 10% of acetone formed products.

(c) Combined Glycerol Conversion and Fischer-Tropsch Synthesis:

Tables 16-18 give the carbon product distribution for conversion of an 80 wt % glycerol solution via conversion to synthesis gas with subsequent Fischer-Tropsch synthesis in a two-bed reactor at 548 K and 5 bar. FIG. 7 shows the molecular weight distribution for these experiments. This distribution deviates from Anderson-Schulz-Flory kinetics. A glycerol feed flow rate of ~0.04 cm$^3$ min$^{-1}$ was used with 1.0 g of 10 wt % Pt—Re (1:1)/C and 1.7-3.0 g 1.0 wt % Ru/TiO$_2$. The sum of the species in the carbon distribution tables (Tables 10-12, 14, and 16-18) may differ slightly from the total $C_{Out}$ values in the carbon balance tables (Tables 13 and 15). This difference results from the omission of minor product species from the carbon distribution tables.

TABLE 9

Properties of Fischer-Tropsch Catalysts.

| Ru loading (wt %) | BET surface area (m$^2$ g$^{-1}$) | Dispersion (O:Ru ratio) | Ru site density (10$^{16}$ m$^{-2}$) | Average pellet radius (10$^{-4}$ m) | Average pore radius$^a$ (10$^{-10}$ m) | χ (10$^{16}$ m$^{-1}$)$^b$ |
|---|---|---|---|---|---|---|
| 1.0 | 18 | 0.55 | 180 | 0.63 | 201 | 40 |
| 2.9 | 30 | 0.36 | 208 | 0.63 | 165 | 50 |

$^a$Estimated from BET surface area measurement and values for similar catalysts studied by Iglesia, et al. (39)
$^b$Calculated as in reference (39).

TABLE 10

Carbon distribution for conversion of glycerol to synthesis gas over Pt-Re/C at 548 K and 8 bar. Reaction carried out using 0.08 cm$^3$ min$^{-1}$ of 30 wt % glycerol feed solution.

Liquid phase carbon distribution (carbon flow rate in µmol min$^{-1}$)

| Methanol | Ethanol | Acetone | n-Propanol | Acetic Acid | Acetol | Ethylene Glycol | Glycerol |
|---|---|---|---|---|---|---|---|
| 26 | 28 | 11 | 4.2 | 8.0 | 119 | 80 | 75 |

Gas phase carbon distribution (carbon flow rate in µmol min$^{-1}$)

| CO | CH$_4$ | CO$_2$ | Ethane | Propane |
|---|---|---|---|---|
| 380 | 23 | 63 | 8.9 | 4.9 |

TABLE 11

Liquid phase carbon distribution for conversion of 50 and 80 wt % aqueous-glycerol solutions to synthesis gas over Pt-Re/C at 548 K and various pressures.

Liquid phase carbon distribution (carbon flow rate in µmol min$^{-1}$)

| Feed Concentration (wt %) | Pressure (bar) | Methanol | Ethanol | Acetone | n-Propanol | Acetic Acid | Acetol | Ethylene Glycol | Propanediols |
|---|---|---|---|---|---|---|---|---|---|
| 80 | 1 | 11 | 3.3 | 1.4 | — | 8.8 | 0.87 | 0.75 | 0.83 |
| 50 | 1 | 13 | 3.4 | 1.8 | — | — | — | — | — |
| 80 | 5 | 20 | 51 | 12 | — | 17 | 49 | 18 | 43 |
| 50 | 5 | 19 | 28 | 8.8 | — | 10 | 3.8 | 7.2 | — |
| 80 | 11 | 14 | 67 | 18 | 15 | 13 | 85 | 19 | 92 |
| 50 | 11 | 11 | 45 | 16 | 8.6 | 6.6 | 58 | 13 | 53 |

TABLE 12

Gas phase carbon distribution for conversion of 50 and 80 wt % aqueous-glycerol solutions to synthesis gas over Pt-Re/C at 548 K and various pressures.

| Feed Concentration (wt %) | Pressure (bar) | Gas phase carbon distribution (carbon flow rate in μmol min⁻¹) | | | | |
|---|---|---|---|---|---|---|
| | | CO | $CH_4$ | $CO_2$ | Ethane | Propane |
| 80 | 1 | 724 | 39 | 27 | 21 | 4.8 |
| 50 | 1 | 613 | 27 | 57 | 9.3 | 2.5 |
| 80 | 5 | 413 | 41 | 33 | 19 | 8.2 |
| 50 | 5 | 427 | 35 | 55 | 12 | 3.9 |
| 80 | 11 | 280 | 46 | 59 | 22 | 9.4 |
| 50 | 11 | 215 | 42 | 79 | 19 | 13 |

TABLE 13

Carbon balance for conversion of 50 and 80 wt % aqueous-glycerol solutions to synthesis gas over Pt-Re/C at 548 K and various pressures.

| Feed Concentration (wt %) | Pressure (bar) | Total $C_{in}$ (μmol min⁻¹) | Total $C_{out}$ gas (μmol min⁻¹) | Total $C_{out}$ liquid[a] (μmol min⁻¹) | C balance (%) |
|---|---|---|---|---|---|
| 80 | 1 | 946 | 816 | 52 | 8 |
| 50 | 1 | 737 | 708 | 23 | 0.8 |
| 80 | 5 | 914 | 515 | 431 | 4 |
| 50 | 5 | 700 | 533 | 128 | 6 |
| 80 | 11 | 946 | 417 | 552 | 2 |
| 50 | 11 | 663 | 368 | 352 | 9 |

[a]Determined via total organic carbon analysis of liquid effluent.

TABLE 15

Carbon balance for Fischer-Tropsch experiments (same conditions as in Table 14).

| Oxygenated Feed Molecule | Total $C_{in}$ (μmol min⁻¹) | Total $C_{out}$ liquid aqueous phase (μmol min⁻¹) | Total $C_{out}$ liquid organic phase (μmol min⁻¹) | Total $C_{out}$ gas (μmol min⁻¹)[a] | C balance (%) |
|---|---|---|---|---|---|
| — | 2024 | — | 183 | 1908 | 3 |
| Water | 2024 | — | 145 | 1983 | 5 |
| Acetol/Water | 2670 | 193 | 522 | 1964 | 0.3 |
| Ethanol/Water | 2801 | 436[b] | 178 | 2168 | 0.7 |
| Acetone/Water | 2967 | 501[c] | 146 | 2433 | 4 |

[a]Includes unconverted CO.
[b]Unconverted ethanol.
[c]Unconverted acetone.

TABLE 14

Carbon distribution for Fischer-Tropsch experiments. Total pressure of 5 bar for dry synthesis gas run ($P_{CO}$ = 1.7 and $P_{H2}$ = 3.3) and total pressure of 8.1 bar for co-feed experiments.

| Oxygenated Feed Molecule | Carbon distribution (carbon flow rate in μmol min⁻¹) | | | | | | | | | | |
|---|---|---|---|---|---|---|---|---|---|---|---|
| | CO | $CO_2$ | $CH_4$ | $C_2$-$C_4$ | $C_5$-$C_{15}$ | $C_{16}$-$C_{50}$ | Acetone | Ethanol | Methanol | n-Propanol | $C_4$-$C_7$ Ketones |
| — | 955 | 100 | 400 | 303 | 257 | 75 | — | — | — | — | — |
| Water[a] | 917 | 274 | 386 | 275 | 223 | 55 | — | — | — | — | — |
| Acetol/Water[b] | 1411 | 57 | 193 | 135 | 382 | 105 | 269 | 5 | 6 | 1.5 | 116 |
| Ethanol/Water[c] | 1482 | 83 | 297 | 174 | 222 | 64 | — | 456[e] | 3 | — | — |
| Acetone/Water[d] | 1622 | 79 | 260 | 146 | 174 | 60 | 719[f] | 14 | — | — | 4 |

[a]$P_{CO}$ = 1.7 bar, $P_{H2}$ = 3.5 bar, $P_{H2O}$ = 2.9 bar.
[b]$P_{CO}$ = 1.8 bar, $P_{H2}$ = 3.5 bar, $P_{H2O}$ = 2.6 bar, $P_{acetol}$ = 0.2 bar.
[c]$P_{CO}$ = 1.9 bar, $P_{H2}$ = 3.7 bar, $P_{H2O}$ = 2.2 bar, $P_{ethanol}$ = 0.3 bar.
[d]$P_{CO}$ = 1.9 bar, $P_{H2}$ = 3.8 bar, $P_{H2O}$ = 2.1 bar, $P_{acetone}$ = 0.3 bar.
[e]Unconverted ethanol co-feed.
[f]Unconverted acetone co-feed.

TABLE 16

Carbon distribution in the gas phase for combined glycerol conversion with Fischer-Tropsch synthesis. Reaction carried out using 0.04 cm³ min⁻¹ of 80 wt % glycerol feed.

| Mass Pt-Re/C (g) | Mass Ru/TiO$_2$ (g) | Gas phase carbon distribution (carbon flowrate in μmol min⁻¹) | | | | | | | | | | |
|---|---|---|---|---|---|---|---|---|---|---|---|---|
| | | CO | $CH_4$ | $CO_2$ | $C_2$ | $C_3$ | $C_4$ | $C_5$ | $C_6$ | $C_7$ | $C_8$ | $C_9$ |
| 1.0 | 1.7 | 296 | 70 | 120 | 32 | 26 | 8.2 | 5.8 | 5.9 | 2.3 | 0.8 | 0.2 |
| 1.1 | 3.0 | 235 | 93 | 175 | 40 | 34 | 14 | 9.0 | 8.2 | 3.0 | 1.0 | 0.2 |

TABLE 17

Carbon distribution in the aqueous liquid phase for combined glycerol conversion with Fischer-Tropsch synthesis. Reaction conditions as in Table 16.

| Mass Pt-Re/C (g) | Mass Ru/TiO$_2$ (g) | Aqueous liquid phase carbon distribution (carbon flow rate in μmol min⁻¹) | | | | | | | | |
|---|---|---|---|---|---|---|---|---|---|---|
| | | Methanol | Ethanol | Acetone | i-Propanol | n-Propanol | i-Propyl ether | 2-Butanol | Propyl ether | 1,2-Propanediol |
| 1.0 | 1.7 | 7.3 | 22 | 24 | 1.1 | 7.6 | 9.5 | 1.3 | 19 | 11 |
| 1.1 | 3.0 | 13 | 37 | 50 | 2.3 | 13 | 23 | 2.3 | 21 | 8.0 |

TABLE 18

Carbon distribution in the organic liquid phase for combined glycerol conversion with Fischer-Tropsch synthesis. Reaction conditions as in Table 16.

| Mass Pt-Re/C (g) | Mass Ru/TiO$_2$ (g) | Organic liquid phase carbon distribution (carbon flow rate in μmol min⁻¹) | | | | | | | | | |
|---|---|---|---|---|---|---|---|---|---|---|---|
| | | $C_6$ | $C_7$ | $C_8$ | $C_9$ | $C_{10}$ | $C_{11}$ | $C_{12}$ | $C_{13}$ | $C_{14}$ | $C_{15}$ | $C_{16-40}$ |
| 1.0 | 1.7 | 8.1 | 14 | 11 | 10 | 11 | 12 | 7.0 | 5.4 | 5.7 | 3.4 | 14 |
| 1.1 | 3.0 | 12 | 11 | 7.1 | 5.4 | 10 | 8.8 | 5.3 | 4.5 | 2.0 | 1.7 | 19 |

Example 8

Conversion of Glucose to Hydrocarbons

A 5 wt % ruthenium catalyst supported on activated carbon was prepared according to the general method of Example 1. An aqueous solution, 38 ml, containing 0.98 g of ruthenium (III) nitrosylnitrate (Alfa Aesar, 1.5% Ru) was added to 47.52 g activated carbon (Calgon OLC-AW, sieved to 18-40 mesh). The mixture was dried at 100° C. under vacuum. Three additional applications using 38 ml of this solution, then a last application, using 14 ml of this solution diluted to 38 ml, were performed. The carbon mixture was dried at 100° C. under vacuum between each application.

A bimetallic catalyst system containing platinum and rhenium (5 wt % platinum with a molar ratio of Pt:Re of 1:2.5) supported on activated carbon (Calgon OLC-AW, sieved to 18-40 mesh) was prepared using incipient wetness techniques as described in Example 1. Activated carbon was added slowly to a 30% hydrogen peroxide solution. After addition of the carbon was completed, the mixture was left overnight. The aqueous phase was decanted and the carbon was washed three times with deionized water, then dried under vacuum at 100° C. An aqueous solution, with a volume equal to incipient wetness volume for the carbon to be impregnated and containing dihydrogen hexachloroplatinate (IV) hexahydrate (Alfa Aesar, 39.85% Pt) and perrhenic acid solution (Alfa Aesar, 76.41% $HReO_4$) was applied drop-wise, while stirring, to hydrogen peroxide-functionalized carbon. The wetted carbon was dried at 100° C. under vacuum.

A 0.334 inch ID reactor tube was loaded with Pt/Re and Ru catalysts; 10.28 grams of the Pt/Re catalyst was loaded into the bottom of the reactor and 2.28 grams of the Ru catalyst was loaded into the top of the reactor (using a test reactor as shown in FIG. 3). The stainless steel tube reactor was placed within a furnace that contains three electrically heated zones. The temperature of each electrically heated zone was controlled with separate PID controller that measures the skin temperature of the reactor section in the heated zone and controls the electrical output to the heater associated with each heated zone. The glucose feed solution was continuously fed into the reactor using an HPLC pump (designated "liquid feed" in FIG. 3). The material exiting the reactor was cooled by passing it through a water jacketed heat exchanger, and was then passed to a phase separator to separate the liquid products from the gaseous products.

As shown at the bottom of FIG. 3, gases exit the phase separator via a manifold which was maintained at constant pressure by a pressure control subsystem (not shown in FIG. 3). The quantity of gas exiting the phase separator was measured by a mass flow meter. The composition of the exiting gas was monitored by gas chromatography.

The liquid level in the phase separator was maintained at a constant level by a level control subsystem (not shown). The aqueous solution that drained from the phase separator during a catalyst evaluation experiment was collected and the quantity collected was measured gravimetrically. Various analyses of the solution-phase products were performed, including pH and total organic carbon concentration. Gas chromatography was performed to determine the concentrations of unreacted substrate and to identify specific intermediates and side products.

Before each experiment, the catalyst was pretreated with flowing hydrogen at 250° C. over a 2 hour period. The reactor zone temperatures were set such that the Ru/C catalyst was operated at 130° C. and the Pt/Re catalyst was operated at 240° C. The total system pressure was 495 psig. A 30 wt % glucose in water solution was fed to the reactor with a WHSV of 1.2 grams of glucose per gram of catalyst (total grams of catalyst) per hour. In this system, there was complete conversion of the glucose. Table 19 shows the yields of hydrogen as well as the yields of carbon-containing product compounds. Additionally, this table show the formation of C9-C18 components which indicates chain lengthening due to Fischer-Tropsch reaction.

TABLE 19

Hydrogen and Carbon Yields.

| Moles H$_2$/Mole Feed | 1.37 |
|---|---|
| PRODUCT | % Carbon/Carbon in Feed |
| CO$_2$ | 36.39 |
| Methane | 2.39 |
| Ethane | 3.51 |
| Propane | 4.12 |
| Butane | 3.74 |
| Pentane | 1.65 |
| Hexane | 1.74 |
| Organic Phase Carbon | 17.34 |
| Aqueous Phase Carbon | 28.77 |
| % Glucose Conversion | 100.00 |
| PPM in Organic Phase | |
| NONANE | 946 |
| DECANE | 519 |
| UNDECANE | 582 |
| DODECANE | 267 |
| TETRADECANE | |
| PENTADECANE | 98 |
| HEXADECANE | |
| HEPTADECANE | 797 |
| OCTADECANE | |
| EICOSANE | |

REFERENCES CITED

The following references are incorporated herein by reference.

(1) D. L. Klass, *Biomass for Renewable Energy, Fuels and Chemicals* (Academic Press, San Diego, 1998).
(2) E. Iglesia, S. C. Reyes, R. J. Madon, S. L. Soled, *Adv. Catal.* 39, 221 (1993).
(3) K. A. Pokrovski, M. D. Rhodes, A. T. Bell, *J. Catal.* 235, 368 (2005).
(4) M. Asadullah, S. I. Ito, K. Kunimori, M. Yamada, K. Tomishige, *Environ. Sci. Technol.* 36, 4476 (2002).
(5) F. Chornet, D. Wang, S. Czernik, D. Montane, M. Mann, "Biomass-to-hydrogen via fast pyrolysis and catalytic steam reforming," (Proceedings of the U.S. Dept. of Energy Hydrogen Program Review, 1996).
(6) R. L. Bain et al., *Ind. Eng. Chem. Res.* 44, 7945 (2005).
(7) J. M. Encinar, J. F. GonzMez, and A. Rodriguez-Reinares, *Ind Eng. Chem. Res.* 44, 5491 (2005).
(8) Jon Van Gerpen, *Fuel Proc. Technol.* 86, 1097 (2005).
(9) Kahraman Bozbas, *Renew. Sustain. Ener. Rev.*, in press.
(10) C. S. Gong, J. X Du, N. J. Cao, G. T. Tsao, *Appl. Biochem. Biotechnol.* 84-86, 543 (2000).
(11) H. Shapouri, J. A. Duffield, M. Wang, *The Energy Balance of Corn: An Update* (report no. 814, Office of the Chief Economist, U.S. Department of Agriculture, 2002; available at http://www.usda.gov/oce/oepnu/aer-814.pdf).
(12) D. Pimentel and T. W. Patzek, *Nat. Resources Res.* 14, 65 (2005).
(13) S. P. Chopade et al., Published Patent Cooperation Treaty Application WO 01/66499 (PCT/US 01/00536) (published Sep. 13, 2001; international filing date Jan. 8, 2001).
(14) R. R. Davda, J. A. Dumesic, *Chem. Comm.* 1, 36 (2004).
(15) G. Gubitosa, B. Casale, Published Eur. Pat. Appl., EP 0 553 815 (published Aug. 4, 1993).
(16) T. A. Werpy, J. G. Frye, Jr., A. H. Zacher, D. J. Miller, Published Patent Cooperation Treaty Application WO 03/035582 (PCT/US 02/33982) (published May 1, 2003; international filing date Oct. 23, 2002).
(17) R. D. Cortright, R. R. Davda, J. A. Dumesic, *Nature* 418, 964 (2002).
(18) G. W. Huber, J. W. Shabaker, J. A. Dumesic, *Science* 300, 2075 (2003).
(19) J. W. Shabaker, R. R. Davda, G. W. Huber, R. D. Cortright, J. A. Dumesic, *J. Catal.* 215, 344 (2003).
(20) S. Czernik, R. French, C. Feik, F. Chomet, *Ind. Eng. Chem. Res.* 41, 4209 (2002).
(21) T. Hirai, N. Ikenaga, T. Miyake, T. Suzuki, *Ener. Fuels* 19, 1761 (2005).
(22) A. Basinska, L. Kepinski, F. Domka, *Appl. Catal., A: Gen.* 183, 43 (1999).
(23) R. J. Gorte, S. Zhao, *Catal. Today* 104, 18 (2005).
(24) F. Esch et al., *Science* 309, 752 (2005).
(25) E. Christoffersen, P. Liu, A. Ruban, H. L. Skriver, J. K. Norskov, *J. Catal.* 199, 123 (2001).
(26) A. P. Steynberg, R. L. Espinoza, B. Jager, A. C. Vosloo, *Appl. Catal., A: Gen.,* 186, 41(1999).
(27) J. Greely, M. Mavrikakis, *Nature Mater.* 3, 810 (2004).
(28) B. F. Spiewak, J. Shen, J. A. Dumesic, *J. Phys. Chem.* 99, 17640 (1995).
(29) C. E. Hori et al., *Appl. Catal. B: Environ.* 16, 105 (1998).
(30) M. A. Aramendia et al., *Colloids and Surfaces A: Physicochem. Eng. Aspects* 234, 17 (2004).
(31) R. J. Gorte, S. Zhao, *Catal. Today* 104, 18 (2005).
(32) F. Esch et al, *Science* 309, 752 (2005).
(33) B. Linnhoff, D. R. Vredeveld, *Chem. Eng Progress* (July 1984), pp. 33-40.
(34) B. Linhoff, *Chem Eng Res. & Design* 71(A5), 503-522, (1993).
(35) C. N. Hamelinck, A. P. C. Faaij, H. den Uil and H. Boerrigter, *Energy,* 2004, 29, 1743-1771.
(36) T. Patzek and D. Pimentel, *Critical Reviews in Plant Sciences,* 2005, 24, 327-364.
(37) R. R. Soares, D. A. Simonetti and J. A. Dumesic, *Angew. Chem. Int. Ed,* 2006, 45, 3982-3985.
(38) E. Iglesia, *Appl. Catal. A Gen.,* 1997, 161, 59-78.
(39) E. Iglesia, S. C. Reyes and R. J. Madon, *J. Catal.,* 1991, 129, 238-256.
(40) E. Iglesia, S. L. Soled, and R. A. Fiato, *J. Catal.,* 1992, 137, 212-224.
(41) K. C. Taylor, *J. Catal.,* 1975, 38, 299-306.

What is claimed is:
1. A method of fabricating $C_2$ to $C_{36}$ linear or branched hydrocarbons or oxygenated hydrocarbons comprising:
(a) performing an endothermic gasification reaction with a reactant stream comprising compounds selected from the group consisting of polysaccharides, monosaccha- rides, polyols, and combinations thereof, at a temperature less than or equal to about 625 K, to yield synthesis gas;

(b) performing an exothermic Fischer-Tropsch reaction with the synthesis gas of step (a) at a temperature greater than or equal to the temperature of the gasification reaction performed in step (a), wherein the reaction produces $C_2$ to $C_{36}$ hydrocarbons or oxygenated hydrocarbons, and heat; and (c) integrating the heat generated from the Fischer-Tropsch reaction of step (b) with the endothermic gasification reaction of step (a).

2. The method of claim 1, comprising performing step (a) and step (b) simultaneously in a single reactor vessel.

3. The method of claim 2, comprising performing step (a) and step (b) using more than one catalyst bed.

4. The method of claim 1, comprising performing step (a) before and step (b), and performing step (a) and step (b) sequentially in separate reactor vessels.

5. The method of claim 1, wherein step (a) comprises performing the endothermic gasification reaction with a reactant comprising one or more compounds selected from the group consisting of polysaccharides, monosaccharides, and polyols.

6. The method of claim 5, wherein step (a) comprises performing the endothermic gasification reaction with a reactant comprising glycerol.

7. The method of claim 1, wherein step (a) and step (b) are performed using one or more catalysts comprising a Group VIIIB metal (Fe, Co, Ni, Ru, Rh, Pd, Os, Ir, and Pt).

8. The method of claim 7, wherein the catalyst is alloyed with, is combined with, or further comprises one or more elements selected from the group consisting of Cu, K Mn, La, Re, Zn, Si, Ag, Ce Gd, Th, Mn, Zr, Ti, Cr, V, Li, Na, Rb, Cs, Mo, Au, B, and Cl, and oxides thereof.

9. The method of claim 1, wherein step (a) and step (b) are performed using one or more catalyst(s) comprising platinum, ruthenium, rhenium, and combinations thereof.

10. The method of claim 1, wherein step (a) and step (b) are performed using one or more catalysts comprising a Group VIIIB metal disposed on a support.

11. The method of claim 10, wherein the support is selected from the group consisting of carbon, and oxides of aluminum, cerium, zirconium, and magnesium, and combinations thereof.

12. The method of claim 10, wherein the support is selected from the group consisting of $TiO_2$, $SiO_2$, $Al_2O_3$, $MgO$, $ZrO_2$, $Zr_xTi_yO_2$, $ThO_2$, Kieselguhr, $La_2O_3$, $MgCr_2O_4$, $Ti_xSi_yO_2$, $Ti_xZr_yO_2$, $ZnO$, $Cr_2O_3$, $MnO$, $Nb_2O_5$, $CeO_2$, Y-zeolite, USY-zeolite, ZSM-5 zeolite, MCM-41 zeolite, MCM-22 zeolite, HZSM-5 zeolite, H-BEA zeolite, HY-zeolite, Fe-substituted LTL zeolite, ITQ-6, delaminated zeolite, ITQ-2 delaminated zeolite, HMS molecular sieves, montmorillonite, macroporous styrene-divinylbenzene, 4-vinylpridine-divinylbenzene, anthracene, carbonized-quinoline, and combinations therefore.

13. The method of claim 1, wherein step (a) and step (b) are performed using at least one catalyst comprising platinum, ruthenium, rhenium, and combinations thereof, and wherein the catalyst is disposed on a support selected from the group consisting of carbon, $Al_2O_3$, $CeO_2$, $ZrO_2$, $MgO$, $ZrO_2$, and combinations thereof.

14. The method of claim 1, wherein the synthesis gas from step (a) is introduced directly into the reaction of step (b), absent any pre-treatment.

15. A method of fabricating $C_2$ to $C_{36}$ linear or branched hydrocarbons or oxygenated hydrocarbons comprising:

(a) performing an endothermic gasification reaction with a reactant stream comprising glycerol, at a temperature less than or equal to about 625 K, using a catalyst comprising a Group VIIIB metal, to yield synthesis gas;

(b) performing an exothermic Fischer-Tropsch reaction with the synthesis gas of step (a) at a temperature greater than or equal to the temperature of the gasification reaction performed in step (a), wherein the reaction produces $C_2$ to $C_{36}$ hydrocarbons or oxygenated hydrocarbons, and heat; and (c) integrating the heat generated from the Fischer-Tropsch reaction of step (b) with the endothermic gasification reaction of step (a).

16. The method of claim 15, comprising performing step (a) and step (b) simultaneously in a single reactor vessel.

17. The method of claim 16, comprising performing step (a) and step (b) using more than one catalyst bed.

18. The method of claim 15, comprising performing step (a) before and step (b), and performing step (a) and step (b) sequentially in separate reactor vessels.

19. The method of claim 15, wherein step (a) and step (b) are performed using one or more catalysts comprising a Group VIIIB metal (Fe, Co, Ni, Ru, Rh, Pd, Os, Ir, and Pt).

20. The method of claim 19, wherein the catalyst is alloyed with, is combined with, or further comprises one or more elements selected from the group consisting of Cu, K Mn, La, Re, Zn, Si, Ag, Ce Gd, Th, Mn, Zr, Ti, Cr, V, Li, Na, Rb, Cs, Mo, Au, B, and Cl, and oxides thereof.

21. The method of claim 15, wherein step (a) and step (b) are performed using one or more catalyst(s) comprising platinum, ruthenium, rhenium, and combinations thereof.

22. The method of claim 15, wherein step (a) and step (b) are performed using one or more catalysts comprising a Group VIIIB metal disposed on a support.

23. The method of claim 22, wherein the support is selected from the group consisting of carbon, and oxides of aluminum, cerium, zirconium, and magnesium, and combinations thereof.

24. The method of claim 22, wherein the support is selected from the group consisting of $TiO_2$, $SiO_2$, $Al_2O_3$, $MgO$, $ZrO_2$, $Zr_xTi_yO_2$, $ThO_2$, Kieselguhr, $La_2O_3$, $MgCr_2O_4$, $Ti_xSi_yO_2$, $Ti_xZr_yO_2$, $ZnO$, $Cr_2O_3$, $MnO$, $Nb_2O_5$, $CeO_2$, Y-zeolite, USY-zeolite, ZSM-5 zeolite, MCM-41 zeolite, MCM-22 zeolite, HZSM-5 zeolite, H-BEA zeolite, HY-zeolite, Fe-substituted LTL zeolite, ITQ-6, delaminated zeolite, ITQ-2 delaminated zeolite, HMS molecular sieves, montmorillonite, macroporous styrene-divinylbenzene, 4-vinylpridine-divinylbenzene, anthracene, carbonized-quinoline, and combinations therefore.

25. The method of claim 15, wherein step (a) and step (b) are performed using at least one catalyst comprising platinum, ruthenium, rhenium, and combinations thereof, and wherein the catalyst is disposed on a support selected from the group consisting of carbon, $Al_2O_3$, $CeO_2$, $ZrO_2$, $MgO$, $ZrO_2$, and combinations thereof.

26. The method of claim 15, wherein the synthesis gas from step (a) is introduced directly into the reaction of step (b), absent any pre-treatment.

* * * * *